United States Patent
Abe et al.

(10) Patent No.: US 8,963,502 B2
(45) Date of Patent: Feb. 24, 2015

(54) METHOD FOR CONTROLLING SECONDARY BATTERY AND POWER STORAGE DEVICE

(75) Inventors: Hiroyuki Abe, Anjo (JP); Tetsuya Hatta, Kuwana (JP)

(73) Assignee: NGK Insulators, Ltd., Nagoya (JP)

( * ) Notice: Subject to any disclaimer, the term of this patent is extended or adjusted under 35 U.S.C. 154(b) by 495 days.

(21) Appl. No.: 13/433,894

(22) Filed: Mar. 29, 2012

(65) Prior Publication Data

US 2012/0187913 A1     Jul. 26, 2012

(30) Foreign Application Priority Data

Oct. 30, 2009  (JP) .................................. 2009-250153

(51) Int. Cl.
  *H02J 7/00*  (2006.01)
  *H01M 10/44*  (2006.01)
  *H01M 10/39*  (2006.01)
(52) U.S. Cl.
  CPC .......... *H01M 10/44* (2013.01); *H01M 10/3909* (2013.01)
  USPC .......................................... 320/132; 320/134
(58) Field of Classification Search
  USPC .......................................... 320/132, 134–136
  See application file for complete search history.

(56) References Cited

U.S. PATENT DOCUMENTS

| 2008/0076010 | A1  | 3/2008 | Sato |
| 2008/0094031 | A1* | 4/2008 | Singh et al. ................... 320/132 |
| 2008/0224541 | A1  | 9/2008 | Fukuhara |

FOREIGN PATENT DOCUMENTS

| JP | 2008-084677 A1 | 4/2008 |
| JP | 2008-236821 A1 | 10/2008 |

OTHER PUBLICATIONS

International Search Report dated Dec. 7, 2010.

* cited by examiner

*Primary Examiner* — Samuel Berhanu
(74) *Attorney, Agent, or Firm* — Burr & Brown, PLLC

(57) ABSTRACT

An energy amount required for charging from the remaining capacity management value to the vicinity of a charge end and an energy amount required for discharging from the remaining capacity management value to the vicinity of a discharge end are calculated. A charge/discharge energy amount available for the secondary battery is predicted. A time required to complete the correction in the vicinity of the charge end and a time required to complete the correction in the vicinity of the discharge end are predicted based on the calculated energy amount and the predicted energy amount. A correction method having the shorter predicted time of the predicted times is selected. A state of charge of the secondary battery is controlled in such a manner that the remaining capacity management value of the secondary battery is corrected by the selected correction method.

8 Claims, 16 Drawing Sheets

F I G. 1
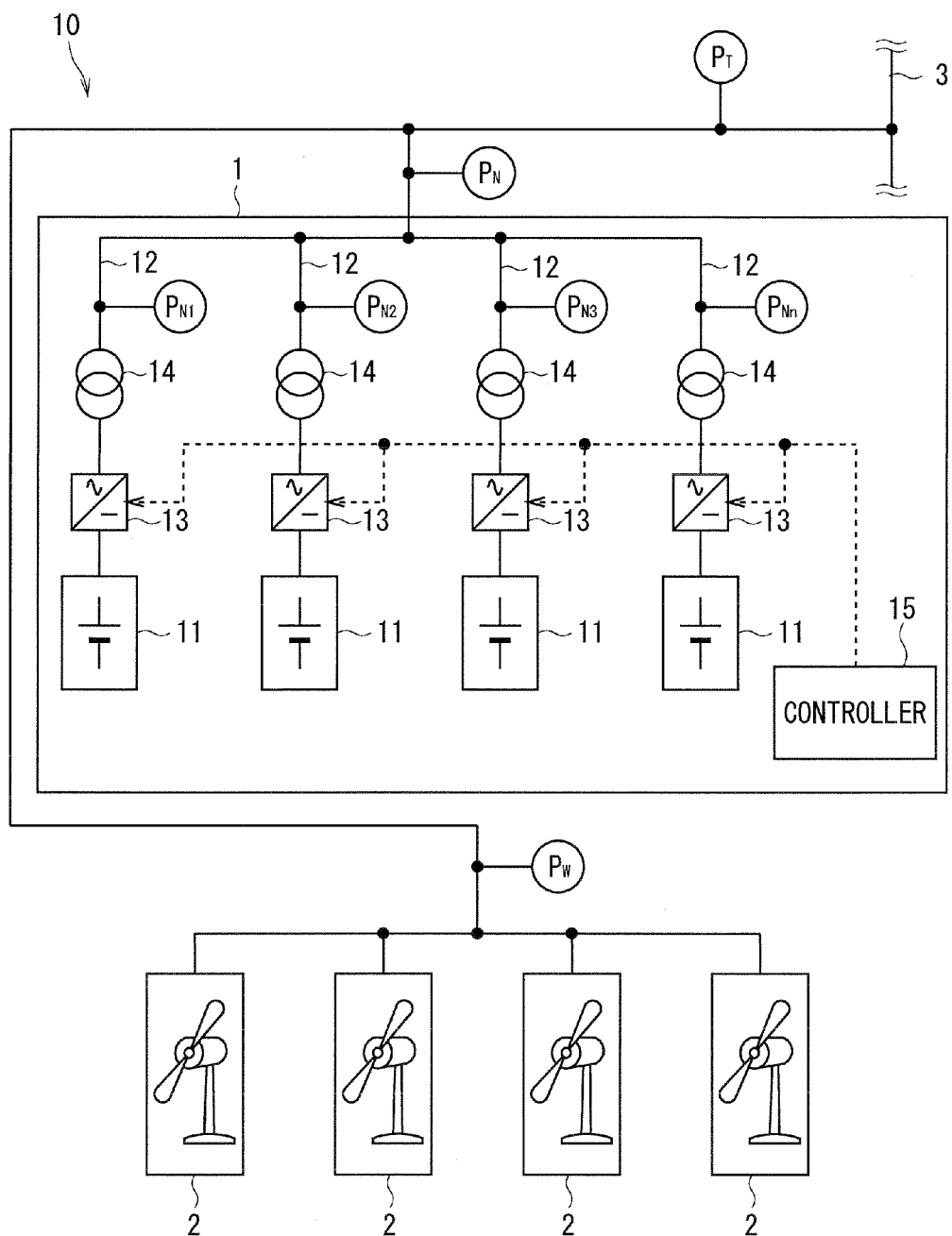

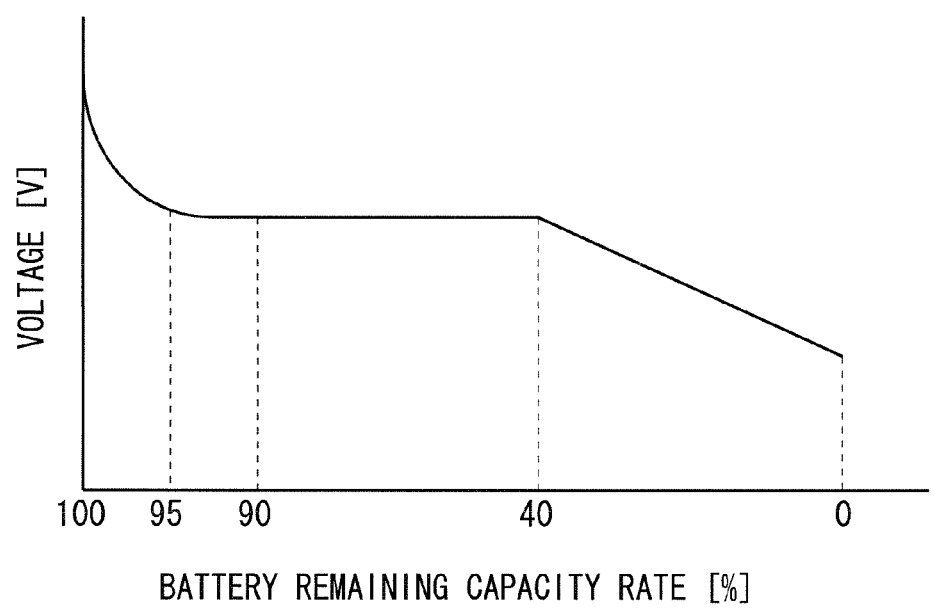
F I G . 4

F I G. 5
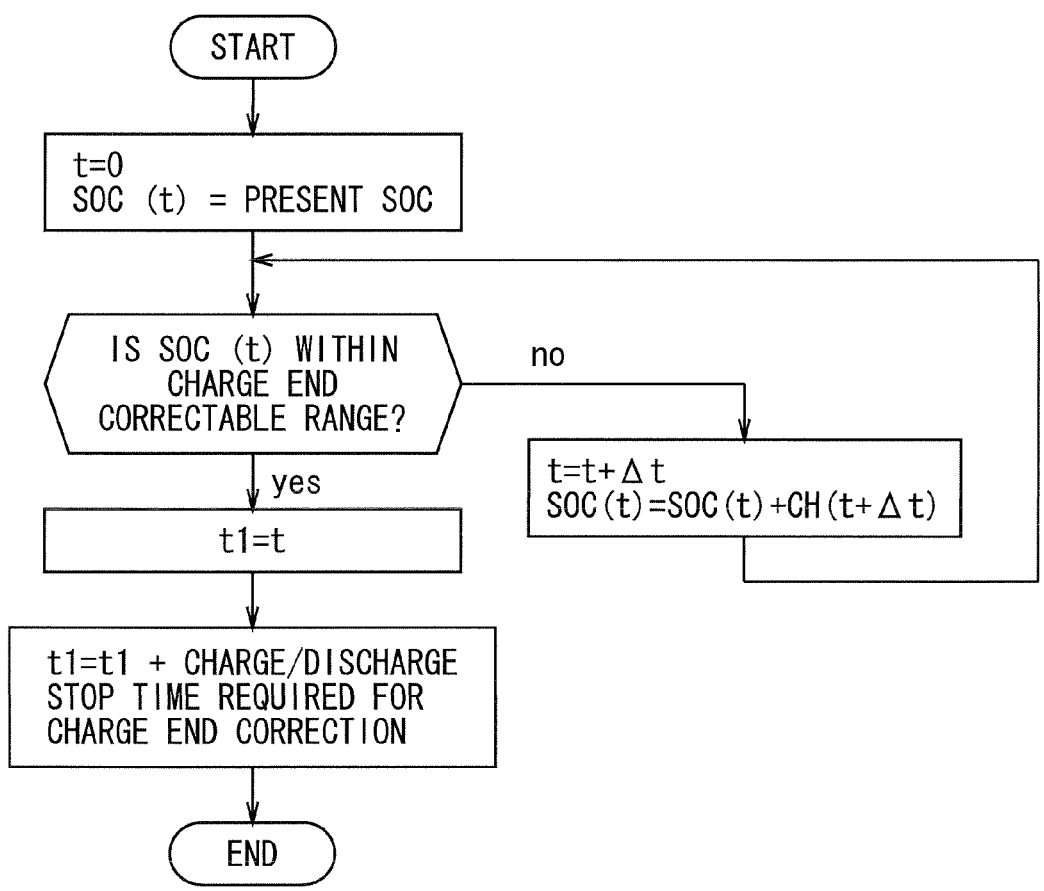

F I G. 8A
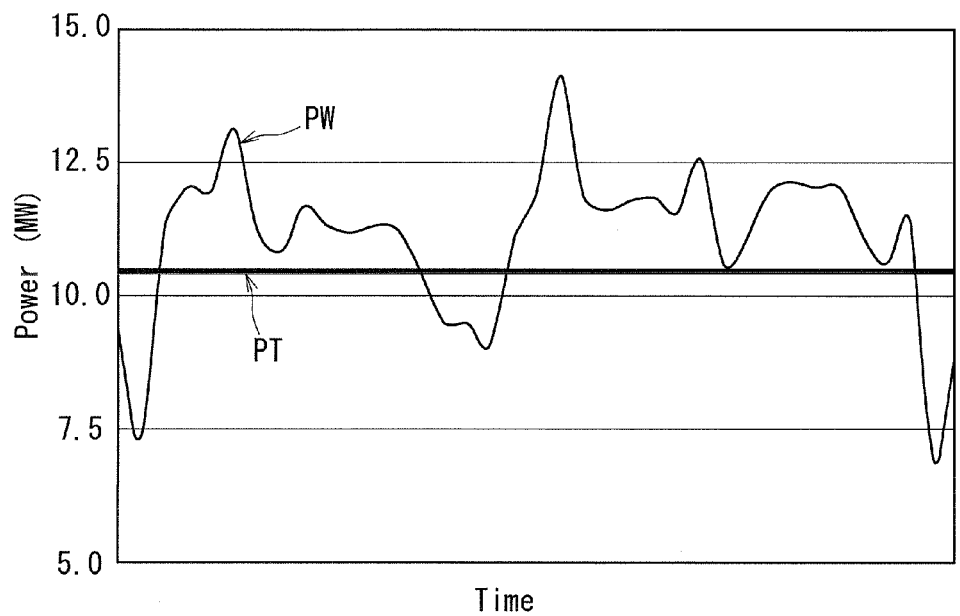
F I G. 8B
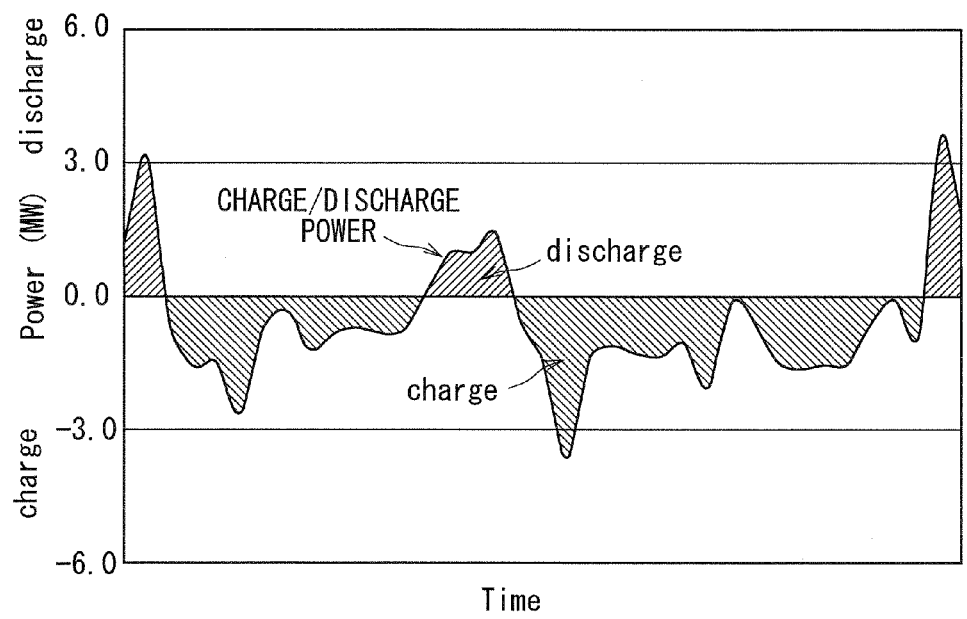

F I G. 1 0 A
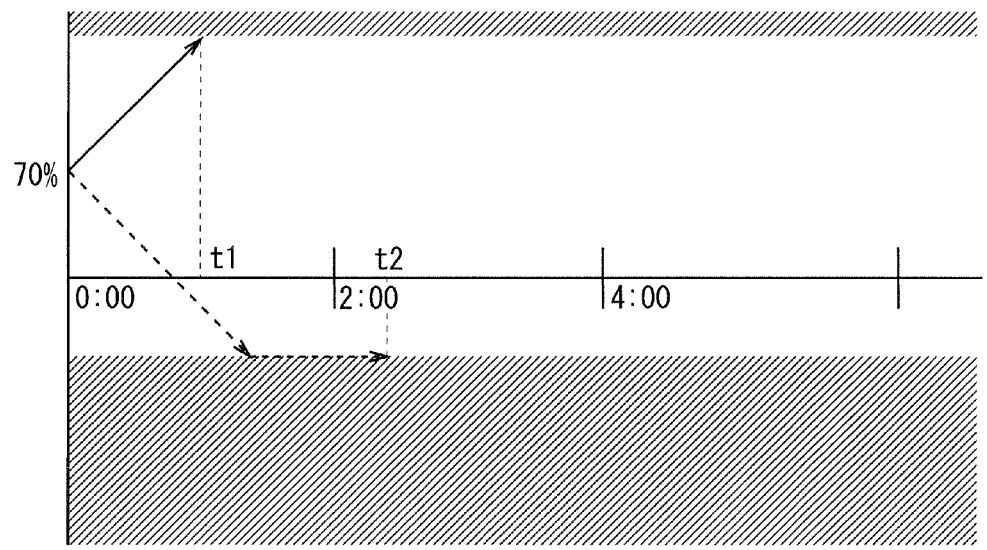
F I G. 1 0 B
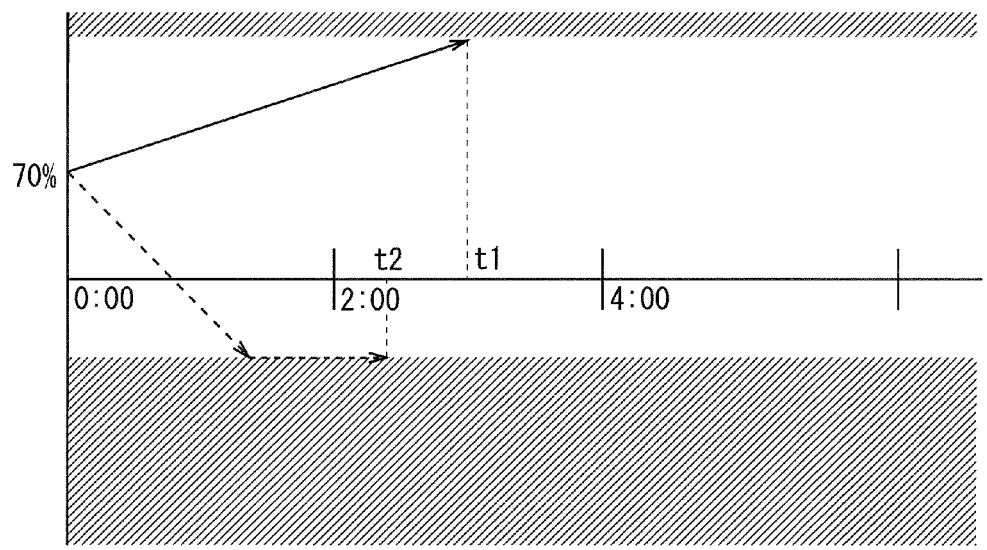

F I G. 1 1 A
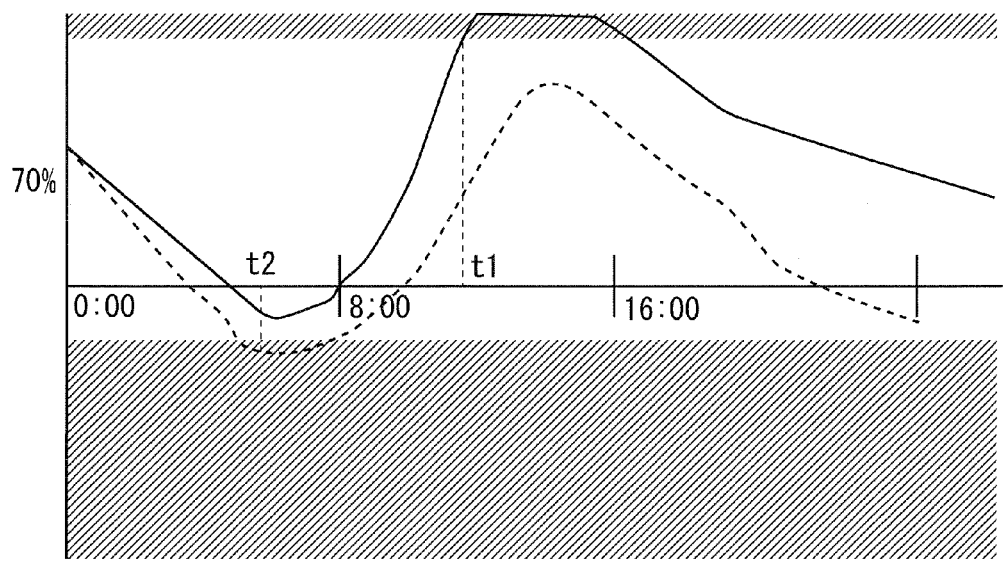
F I G. 1 1 B
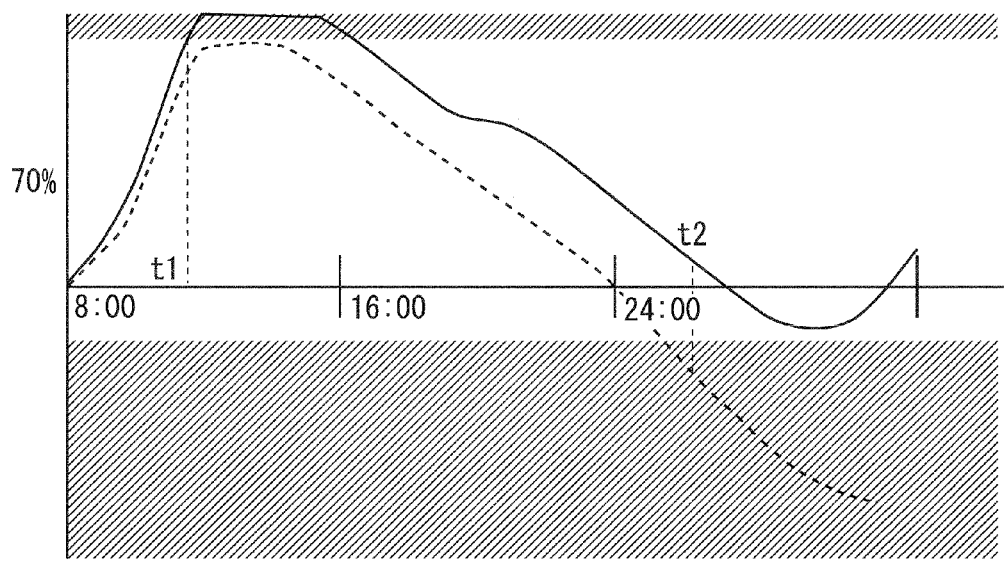

METHOD FOR CONTROLLING SECONDARY BATTERY AND POWER STORAGE DEVICE

TECHNICAL FIELD

The present invention relates to a method for controlling a secondary battery and a power storage device.

BACKGROUND ART

Conventionally, in order to equalize power consumption amounts having a large difference between the daytime and the nighttime, or to compensate an output which fluctuates every moment in a natural energy power generation device, a power storage device having a secondary battery such as a sodium-sulfur battery (hereinafter, also referred to as the NaS battery) as a main component has been used.

A remaining capacity of the NaS battery can be found by loading a current value for charging and discharging in a control device such as a sequencer and adjusting and integrating it and be managed, based on an initially set remaining capacity.

However, while the NaS battery has been used over a long period of time, a difference is generated between an actual remaining capacity and a remaining capacity to be managed (hereinafter, also referred to as the remaining capacity management value). Furthermore, the difference of the remaining capacity management value varies among the NaS batteries. Therefore, the remaining capacity management value needs to be corrected or reset in order to manage the remaining capacity of the NaS battery with high accuracy.

For example, Patent Document 1 below discloses a method for correcting a remaining capacity management value in the vicinity of a charge end or in the vicinity of a discharge end.

PRIOR ART DOCUMENT

Patent Document

Patent Document 1: Japanese Patent Application Laid-Open No. 2008-84677

SUMMARY OF THE INVENTION

Problems to be Solved by the Invention

According to the NaS battery disclosed in Patent Document 1, the remaining capacity management value is corrected by a method such as a charge end correction or a discharge end correction which has been previously set in a control device. That is, the remaining capacity management value is corrected by the correction method which has been previously set regardless of an operating condition of the NaS battery and a natural environment. In addition, as for the NaS battery, the remaining capacity management value may be corrected by setting limitations such that the correction target NaS battery is preferentially charged or discharged until the correction of the remaining capacity management value is completed, or a predetermined storage amount set according to intended use of the power storage device is attained after the completion of the correction.

However, depending on the operating condition of the NaS battery or the natural environment, a time required for the process regarding the above correction is shorter in a case where another method which has not been set is used than in the case where the previously set method is used.

Therefore, the NaS battery disclosed in Patent Document 1 could cause a problem that since a time required for the process regarding the correction is prolonged due to the fact that an optimal correction method is not used, a remaining capacity error is increased, and the charge or discharge end takes place unexpectedly, so that the charging or the discharging of the correction target battery cannot be continued, or a problem that the charging or discharging cannot be continued for a long period of time due to the fact that the remaining capacity is not suitable for the intended use.

Thus, the present invention was made in view of the above problems, and it is an object of the present invention to provide a method for controlling a secondary battery by correcting a remaining capacity management value using an optimal correction method, based on an operating condition of the secondary battery and a natural environment.

Means for Solving the Problems

According to a first aspect of the present invention, a method for controlling a secondary battery as a target for a correction of a remaining capacity management value, in such a manner that the remaining capacity management value is corrected in the vicinity of a charge end or in the vicinity of a discharge end includes a first energy amount calculating step of calculating an energy amount required for charging from the remaining capacity management value to the vicinity of the charge end, and an energy amount required for discharging from the remaining capacity management value to the vicinity of the discharge end, an energy amount predicting step of predicting a charge/discharge energy amount available for the secondary battery, a correction time predicting step of predicting a time required to complete the correction of the remaining capacity management value in the vicinity of the charge end, and a time required to complete the correction of the remaining capacity management value in the vicinity of the discharge end, based on the energy amount calculated by the first energy amount calculating step, and the energy amount predicted by the energy amount predicting step, a correction method selecting step of selecting a correction method having the shorter predicted time of the times predicted by the correction time predicting step, and a charge/discharge controlling step of controlling a state of charge of the secondary battery so as to correct the remaining capacity management value of the secondary battery by the selected correction method.

According to a second aspect of the present invention, as for the method for controlling the secondary battery of the first aspect of the present invention, it further includes a second energy amount calculating step of calculating an energy amount required for charging/discharging from the vicinity of the charge end to a predetermined storage amount set according to intended use of the secondary battery, and an energy amount required for charging/discharging from the vicinity of the discharge end to the predetermined storage amount, in which the correction time predicting step predicts a time required to complete the correction of the remaining capacity management value in the vicinity of the charge end and reach the predetermined storage amount, and a time required to complete the correction of the remaining capacity management value in the vicinity of the discharge end and reach the predetermined storage amount, based on the energy amount calculated by the first energy amount calculating step, the energy amount predicted by the energy amount predicting step, and the energy amount calculated by the second energy amount calculating step.

According to a third aspect of the present invention, as for the method for controlling the secondary battery of the first or second aspect of the present invention, the energy amount predicting step sets the charge energy amount and discharge energy amount available for the secondary battery to the same energy amount.

According to a fourth aspect of the present invention, as for the method for controlling the secondary battery of the first or second aspect of the present invention, in a case where a plurality of secondary batteries are provided, the energy amount predicting step predicts a charge/discharge energy amount available for the correction target secondary battery in a case where the correction target secondary battery is preferentially charged, and the secondary battery other than the correction target secondary battery is preferentially discharged, and a charge/discharge energy amount available for the correction target secondary battery in a case where the correction target secondary battery is preferentially discharged, and the secondary battery other than the correction target secondary battery is preferentially charged.

According to a fifth aspect of the present invention, a power storage device provided with a secondary battery includes a bidirectional converter to control charge/discharge of the secondary battery, and a controller to control the bidirectional converter so as to be the vicinity of a charge end or the vicinity of a discharge end, at which a correction of the remaining capacity management value is carried out, in which the controller includes a first energy amount calculating part to calculate an energy amount required for charging from the remaining capacity management value to the vicinity of the charge end, and an energy amount required for discharging from the remaining capacity management value to the vicinity of the discharge end in the secondary battery as a target for a correction of the remaining capacity management value, an energy amount predicting part to predict a charge/discharge energy amount available for the correction target secondary battery, a correction time predicting part to predict a time required to complete the correction of the remaining capacity management value in the vicinity of the charge end, and a time required to complete the correction of the remaining capacity management value in the vicinity of the discharge end, based on the energy amount calculated by the first energy amount calculating part, and the energy amount predicted by the energy amount predicting part, a correction method selecting part to select a correction method having the shorter predicted time of the times predicted by the correction time predicting part, and a charge/discharge commanding part to control the bidirectional converter so as to correct the remaining capacity management value of the correction target secondary battery by the selected correction method.

According to a sixth aspect of the present invention, as for the power storage device of the fifth aspect of the present invention, it further includes a second energy amount calculating part to calculate an energy amount required for charging/discharging from the vicinity of the charge end to a predetermined storage amount set according to intended use of the secondary battery, and an energy amount required for charging/discharging from the vicinity of the discharge end to the predetermined storage amount, in which the correction time predicting part predicts a time required to complete the correction of the remaining capacity management value in the vicinity of the charge end and reach the predetermined storage amount, and a time required to complete the correction of the remaining capacity management value in the vicinity of the discharge end and reach the predetermined storage amount, based on the energy amount calculated by the first energy amount calculating part, the energy amount predicted by the energy amount predicting part, and the energy amount calculated by the second energy amount calculating part.

According to a seventh aspect of the present invention, as for the power storage device of the fifth or sixth aspect of the present invention, the energy amount predicting part sets the charge energy amount and discharging energy amount available for the correction target secondary battery to the same energy amount.

According to an eighth aspect of the present invention, as for the power storage device of the fifth or sixth aspect of the present invention, in a case where a plurality of the secondary batteries are provided, the energy amount predicting part predicts a charge/discharge energy amount available for the correction target secondary battery in a case where the correction target secondary battery is preferentially charged, and the secondary battery other than the correction target secondary battery is preferentially discharged, and a charge/discharge energy amount available for the correction target secondary battery in a case where the correction target secondary battery is preferentially discharged, and the secondary battery other than the correction target secondary battery is preferentially charged.

Effects of the Invention

According to the present invention including the first to eighth aspects, the remaining capacity management value can be corrected using the optimal correction method, based on the intended use and the operating condition of the power storage device.

According to the present invention including the third and seventh aspects, the approximate time required to correct the remaining capacity management value can be easily predicted.

According to the present invention including the fourth and eighth aspects, the time required for the process regarding the correction can be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram schematically showing a configuration of an interconnected system provided with a power storage device according to a first embodiment of the present invention.

FIG. 4 is a graph showing a relationship between a battery remaining capacity rate and a voltage of the NaS battery.

FIG. 5 is a flowchart showing a method for calculating a predicted time required to complete a charge end correction, in the first embodiment of the present invention.

FIGS. 8A and 8B are charts showing an example in which output power is set such that a charge energy amount becomes greater than a discharge energy amount in a unit of time.

FIGS. 10A and 10B are simulated diagrams showing a predicted time required for a charge end correction, and a predicted time required for a discharge end correction in the first embodiment of the present invention.

FIGS. 11A and 11B are diagrams showing a predicted time required for a charge end correction, and a predicted time required for a discharge end correction in the first embodiment of the present invention.

EMBODIMENTS FOR CARRYING OUT THE INVENTION

Figure 2:
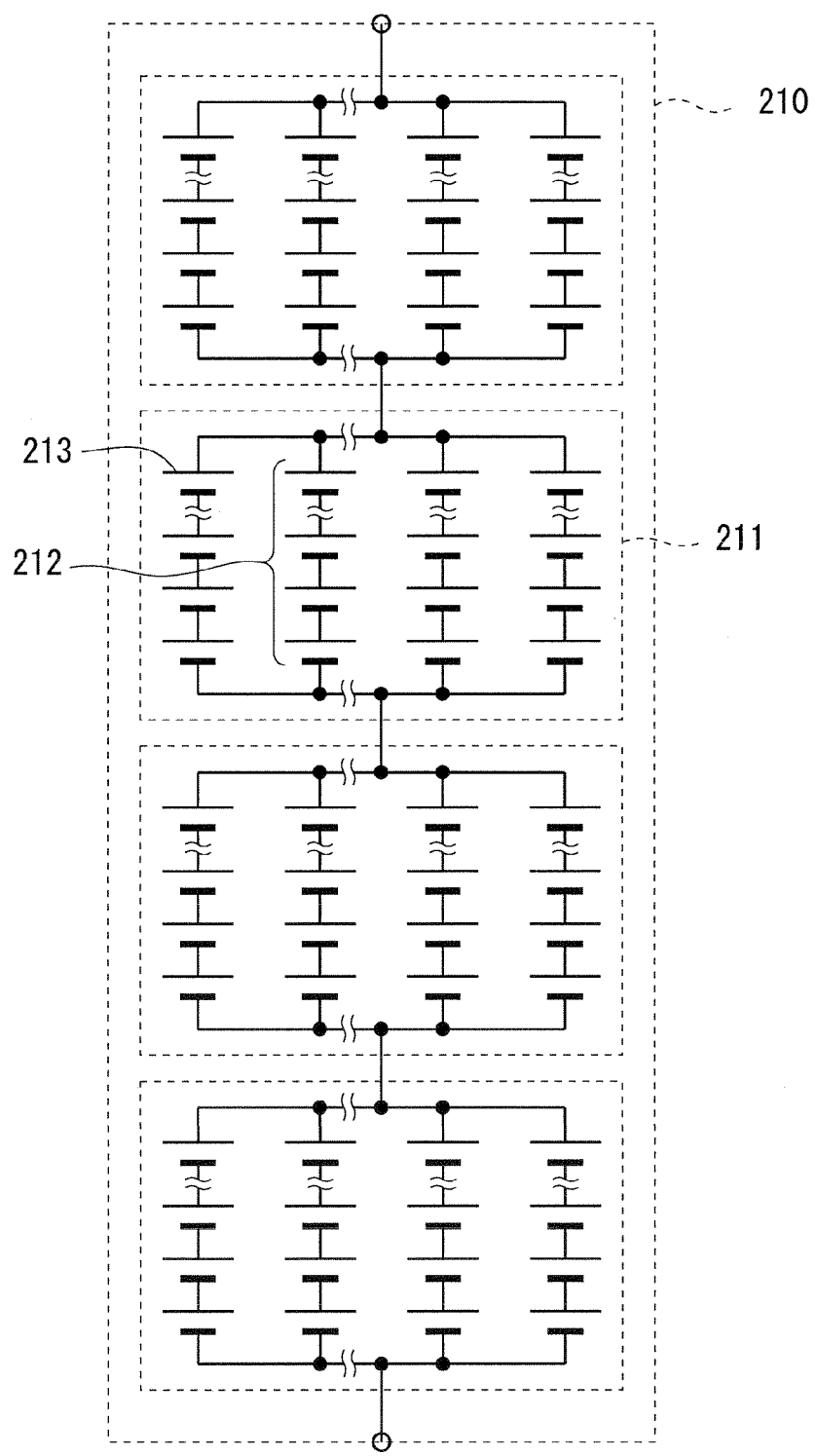
FIG. 2 is a circuit diagram of a module of a NaS battery.

1. First Embodiment 1-1. Configuration of Interconnected System

First, a description will be made of a configuration of an interconnected system 10 provided with a power storage device 1 according to a first embodiment of the present invention.

<1-1-1. Configuration of Interconnected System>

FIG. 1 is a diagram schematically showing the configuration of the interconnected system 10. The interconnected system 10 includes the power storage device 1 and a power generation device 2 whose output fluctuates, and each of them is connected to a power system 3. FIG. 1 illustrates a case where the power generation device 2 is a wind power generation device which generates power by use of wind power, but another natural energy power generation device (such as a solar power generation device) may be used.

The power storage device 1 mainly includes a secondary battery 11 to store power, a connection line 12 to connect the power system 3 to the secondary battery 11, a bidirectional converter 13 to convert power supplied from the secondary battery 11 to the power system 3 from a direct current to an alternating current, and convert power supplied from the power system 3 to the secondary battery 11 from an alternating current to a direct current, a transformer 14 to boost the power supplied from the secondary battery 11 to the power system 3 and lower the power supplied from the power system 3 to the secondary battery 11, and a controller 15 to control the power storage device 1.

The connection line 12, the bidirectional converter 13, and the transformer 14 are provided for each secondary battery 11, respectively, and the bidirectional converter 13 and the transformer 14 are inserted in the connection line 12.

Four secondary batteries 11 are shown in FIG. 1, but the number of the secondary batteries 11 is increased or decreased according to a specification of the power storage device 1. For example, the power storage device 1 may have one secondary battery 11.

In addition, hereinafter, a description will be made of a case where the secondary battery 11 is a sodium-sulfur battery (hereinafter, also referred to as a NaS battery 11).

<1-1-2. Output Power $P_T$ of Interconnected System>

Next, a description will be made of power $P_T$ outputted from the interconnected system 10 to the power system 3.

According to the interconnected system 10, power $P_N$ outputted from the NaS battery 11 (or power $P_N$ inputted to the NaS battery 11) due to charge or discharge of the NaS battery 11 compensates a fluctuation of power $P_W$ outputted from the power generation device 2. As a result, the resultant power ($P_T$) of the interconnected system 10 as a whole is controlled to satisfy that $P_T = P_W + P_N$ = desired power. That is, the resultant output ($P_T$) of the interconnected system 10 is controlled so as to reach the desired power by controlling the charge and discharge of the NaS battery 11. The NaS battery 11 is provided in order to solve various problems (such as a problem that the charge suddenly comes to an end and the charge cannot be continued, or a problem that the discharge suddenly comes to an end and the discharge cannot be continued) which could be caused due to a difference between an actual remaining capacity and a management value (hereinafter, also referred to as the remaining capacity management value), and the remaining capacity management value is managed by being corrected periodically, or at the time of a correction request.

Thus, the controller 15 according to this embodiment is provided to correct the remaining capacity management value by an optimal correction method as will be described below.

<1-1-3. Components of Power Storage Device>

Next, a description will be made of each component of the power storage device 1.

(NaS Battery 11)

FIG. 2 is a circuit diagram of a module 210 of the NaS battery 11. As shown in FIG. 2, the module 210 is a seriesly connected body in which blocks 211 are connected in series, the block 211 is a parallelly connected body in which strings 212 are connected in parallel, and the string 212 is a seriesly connected body in which cells 213 are connected in series. The number of the blocks 211 connected in series, the number of the strings 212 connected in parallel, and the number of the cells 213 connected in series are increased or decreased according to a specification of the module 210.

Each of the NaS batteries 11 includes one or more modules 210, and is charged/discharged separately from another NaS battery 11. The number of the modules 210 is increased or decreased according to a specification of the NaS battery 11.

(Bidirectional Converter 13)

The bidirectional converter 13 controls the charge/discharge of the NaS battery 11 according to a charge/discharge command so that the remaining capacity management value of the NaS battery 11 reaches the desired value. The bidirectional converter 13 is also referred to as a "PCS (Power Conversion System)" or "direct/alternating converter", for example. The mutual conversion between the direct current and alternating current in the bidirectional converter 13 is performed by a PWM (Pulse Width Modulation) inverter and the like.

(Controller 15)

Figure 3:
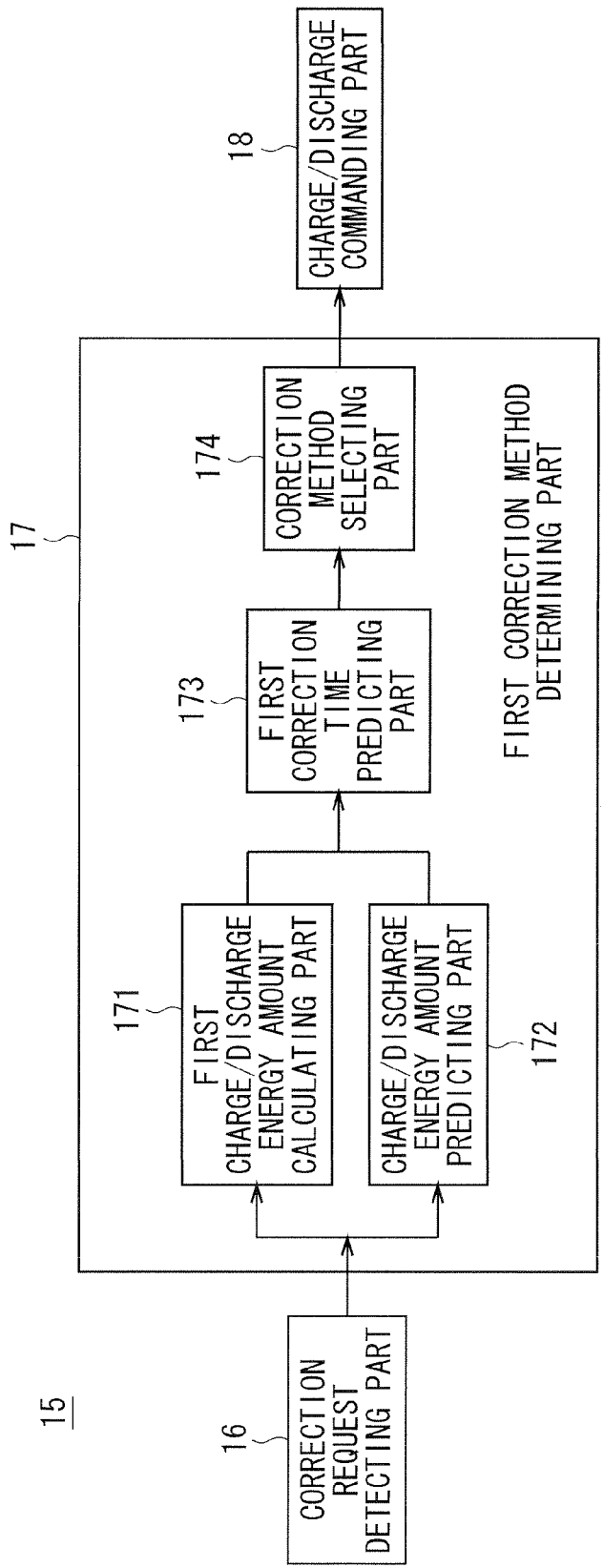
FIG. 3 is a diagram schematically showing a constitution of a controller according to the first embodiment of the present invention.

FIG. 3 is a diagram schematically showing a configuration of the controller 15. Each of blocks in FIG. 3 may be implemented by executing a control program provided in a built-in computer having at least a CPU and a memory, or implemented by hardware.

The controller 15 includes a correction request detecting part 16 which detects a correction request of the remaining capacity management value for any of the NaS batteries 11, a first correction method determining part 17 which determines an optimal method for correcting the remaining capacity management value performed for the correction target NaS battery 11, and a charge/discharge commanding part 18 which commands the bidirectional converter 13 to charge/discharge the NaS battery 11 so that the remaining capacity management value can be corrected by the determined correction method.

The first correction method determining part 17 includes a first charge/discharge energy amount calculating part 171 which calculates an energy amount required for charging from a present remaining capacity management value to the vicinity of a charge end, and an energy amount required for discharging from the present remaining capacity management value to the vicinity of a discharge end in the correction target NaS battery 11, a charge/discharge energy amount predicting part 172 which predicts a charge/discharge energy amount which is available for the correction target NaS battery hereafter, a first correction time predicting part 173 which predicts a time required to correct the remaining capacity management value in the vicinity of the charge end (hereinafter, also referred to as the charge end correction) and a time required to correct the remaining capacity management value in the vicinity of the discharge end (hereinafter, also referred to as the discharge end correction), and a correction method selecting part 174 which selects a correction method having a shorter time of the times predicted by the first correction time predicting part 173.

1-2. Process of Controller 15

Next, a description will be made of a process of the controller 15.

(Detection of Correction Request)

First, the correction request detecting part 16 detects the correction request of the remaining capacity management value of any of the NaS batteries 11. As the method for determining the NaS battery 11 as the target for the correction of the remaining capacity management value, various methods are known and any one of them may be used. For example, the NaS batteries 11 may be sequentially specified one by one at certain timing to correct the remaining capacity management value. In addition, an estimated error of the remaining capacity management value of each of the NaS batteries 11 is found based on a time elapsed from the previous correction to the present, a time for the charging/discharging, charge/discharge power, and a size, steepness, and the number of fluctuation of the charge/discharge power, and the NaS battery 11 whose estimated error exceeds a threshold value may be selected as the correction target.

(Calculation of Energy Amounts Required to Reach the Vicinity of Charge End and the Vicinity of Discharge End)

Next, the first charge/discharge energy amount calculating part 171 calculates the energy amount required to charge/discharge the NaS battery 11 from the present remaining capacity management value until the remaining capacity reaches the remaining capacity in which the correction is made.

FIG. 4 is a graph showing a relationship between a battery remaining capacity rate and a voltage of the NaS battery 11. The battery remaining capacity rate means a rate (%) of capacity which can be discharged with respect to the rating capacity of the NaS battery 11. As shown in FIG. 4, in the vicinity of the charge end (roughly 95% or more) in a two-phase region in which sodium sulfur ($Na_2S_5$) and elemental sulfur (S) exist as a positive-electrode active material, the voltage of the NaS battery 11 rises as the battery remaining capacity rate increases. In the two-phase region (roughly 40% to 90%) except for the charge end, the voltage is roughly constant regardless of the battery remaining capacity rate. In a one-phase region (roughly 40% or less) in which only sodium sulfur ($Na_2S_x$) exists as the positive-electrode active material, the voltage drops as the battery remaining capacity rate decreases.

By use of the relationship between the voltage and the battery remaining capacity rate of the NaS battery 11, the remaining capacity management value is corrected under the condition that a NaS battery 11 is charged to the vicinity of the charge end, or under the condition that the NaS battery 11 is discharged to the one-phase region (in the vicinity of the discharge end).

That is, the first charge/discharge energy amount calculating part 171 calculates the energy amount required for charging until the remaining capacity of the correction target battery reaches the vicinity of the charge end (for example, the battery remaining capacity rate is 95%) from the present remaining capacity management value, and the energy amount required for discharging until it reaches the vicinity of the discharge end (for example, the battery remaining capacity rate is 40%) from the present remaining capacity management value.

(Prediction of Charge/Discharge Energy Amount which is Available for Correction Target NaS Battery 11)

Then, the charge/discharge energy amount predicting part 172 predicts the charge/discharge energy amount which is available for the correction target NaS battery 11 hereafter (hereinafter, also referred to as the predicted charge/discharge energy amount).

The predicted charge/discharge energy amount means the charge/discharge energy amount which is predicted to be allocated to the correction target NaS battery 11, based on the power $P_W$ which is predicted to be generated and outputted by the power generation device 2 hereafter, power $P_N$ which can be inputted/outputted by the non-correction target NaS battery 11 by adjusting the charge and discharge of the non-correction target NaS battery 11, a power transfer plan between the interconnected system 10 (or power storage device) and the power system 3, and the like.

The power $P_W$ which is predicted to be generated and outputted by the power generation device 2 hereafter can be predicted based on a past power generation record and a weather forecast, for example. For example, in a case where the power generation device 2 is the wind power generator, a power generation amount outputted by the power generation device 2 hereafter is predicted at each clock time, based on the past power generation record and a wind forecast, and based on this predicted power generation amount, a past load record, and the remaining capacity management value of the other NaS battery 11, the charge/discharge power which can be transferred by the correction target battery hereafter is predicted. In addition, in a case where the power generation device 2 is the solar power generator, similarly, a power generation amount which is outputted by the power generation device 2 hereafter is predicted at each clock time based on a past power generation record and a weather forecast.

The power transfer plan between the interconnected system 10 (or power storage device) and the power system 3 means, for example, output power set such that the output power $P_T$ of the interconnected system 10 is kept constant, power offset at the time of a power-smoothing operation, and output power set at the time of a load-leveling operation.

In addition, the charge/discharge energy amount predicting part 172 preferably predicts a charge/discharge energy amount (predicted charge/discharge energy amount A) which is predicted to be allocated to the correction target NaS battery 11 when the correction target NaS battery 11 is preferentially charged and the non-correction target NaS battery 11 is preferentially discharged, and a charge/discharge energy amount (predicted charge/discharge energy amount B) which is predicted to be allocated to the correction target NaS battery 11 when the correction target NaS battery 11 is preferentially discharged and the non-correction target NaS battery 11 is preferentially charged. Thus, the charge/discharge energy amount when the power storage device 1 is controlled so that the remaining capacity management value is corrected in a short time can be predicted. For example, the predicted charge/discharge energy amount is found by integrating the predicted charge/discharge power, assuming that the discharge power is positive and the charge power is negative.

A method for preferentially charging or discharging the correction target NaS battery 11 is performed by adjusting the power $P_W$ which is predicted to be generated and outputted by the power generation device 2 hereafter, the power $P_N$n which can be inputted or outputted by the non-correction target NaS battery 11 by adjusting the charge and discharge of the non-correction target NaS battery 11, the power transfer plan between the interconnected system 10 (or power storage device) and the power system 3 which have been described above and the like.

More specifically, the adjustment of the power $P_W$ which is predicted to be generated and outputted by the power generation device 2 hereafter to be made to preferentially charge or discharge the correction target NaS battery 11 can be made by increasing or decreasing the number of power generation facilities connected to the power system 3, or changing a pitch angle (angle of a blade) of the wind power generation facility. However, since it is desirable to maximize the power generated by the natural energy power generation facility in general, it is preferable to adjust the charge/discharge energy amount for the correction target NaS battery 21 without performing such adjustment.

In addition, the adjustment of the power $P_N$n which can be inputted or outputted by the non-correction target NaS battery 11 to be made to preferentially charge or discharge the correction target NaS battery 11 is made by adjusting the inputted/outputted power $P_N$n of the non-correction target NaS battery 11 such that the input/output power $P_N$ of the whole NaS battery can be preferentially allocated to the charge or discharge of the correction target NaS battery 11. More specifically, in the case where the charge end correction is made by charging the correction target NaS battery 11, the charge power is preferentially allocated to the correction target battery and the discharge power is allocated with a lower priority. In addition, in the case where the discharge end correction is made by discharging the correction target NaS battery 11, a process opposite to the above process is performed.

In addition, the adjustment of the power transfer plan between the interconnected system 10 (or power storage device) and the power system 3 to be made to preferentially charge or discharge the correction target NaS battery 11 is made by controlling the input/output power between the interconnected system 10 and the power system 3 such that a balance between supply and demand or frequency fluctuation of the power system 3 can be appropriately maintained. This control of the input/output power differs depending on the power system 3 but in the case where the power outputted from the interconnected system 10 to the power system 3 is controlled, for example, the control is performed by adjusting the output power such that an output power value or a fluctuation rate of the output power falls within an allowable range. In addition, in the case where the interconnected system 10 receives the supply of the power from the power system 3, similarly, the control is performed by adjusting receiving power such that a receiving power vale or a receiving power fluctuation rate falls within an allowable range. For example, the allowable range of the output power value is determined by determining the allowable output power range with respect to each time zone or setting a power purchase price with respect to each time zone such that the power corresponding to the supply and demand is outputted from the interconnected system 10.

For example, in the case where the correction target NaS battery 11 is preferentially charged, a charge energy amount which can be allocated to the correction target NaS battery 11 can be increased by lowering the output power of the interconnected system 10 within an allowable power fluctuation rate without departing from an allowable power value range. In addition, in the case where the correction target NaS battery 11 is preferentially discharged, a discharge energy amount which can be allocated to the correction target NaS battery 11 can be increased by raising the output power of the interconnected system 10 within the allowable power fluctuation rate without departing from an allowable output power range.

Thus, the charge/discharge energy amount predicting part 172 can previously predict the charge/discharge energy amount which can be allocated to the correction target NaS battery 11.

In addition, in a case where the prediction is difficult or the process is to be simplified, the charge/discharge energy amount predicting part 172 may previously store a power generation pattern of one standard day in the controller 15, and calculate the predicted charge/discharge energy amount, or set the predicted charge power and the predicted discharge power to the same power. Thus, when the time required to correct the remaining capacity management value is predicted in the subsequent process, an approximate time can be easily predicted. The standard power generation pattern may be changed periodically (for example, every day, or every month).

(Calculation of Time Required to Correct Remaining Capacity Management Value)

Then, the first correction time predicting part 173 predicts the time required for the correction target NaS battery 11 to complete the charge end correction and the time required to complete the discharge end correction after the correction request detecting part 16 detects the correction request, based on the energy amount required for charging to the vicinity of the charge end and the energy amount required for discharging to the vicinity of the discharge end calculated by the first charge/discharge energy amount calculating part 171, the predicted charge/discharge energy amount predicted by the charge/discharge energy amount predicting part 172, and losses of the bidirectional converter and the NaS battery at the time of charging and discharging.

In addition, the first correction time predicting part 173 can predict the time required to correct the remaining capacity management value in a short time by using the above predicted charge/discharge energy amount A and predicted charge/discharge energy amount B. That is, the time required for the correction is predicted with the predicted charge/discharge energy amount A when the correction target NaS battery 11 is charged for the correction, and with the predicted charge/discharge energy amount B when it is discharged therefor.

Here, as for the discharge end correction of the NaS battery 11, a predetermined charge/discharge stop time is needed to stabilize the output voltage after discharged to the vicinity of the discharge end before the correction is performed. Therefore, the predicted time required to complete the discharge end correction is provided by combining the predicted time required for discharging to the vicinity of the discharge end, and the predetermined charge/discharge stop time.

Figure 6:
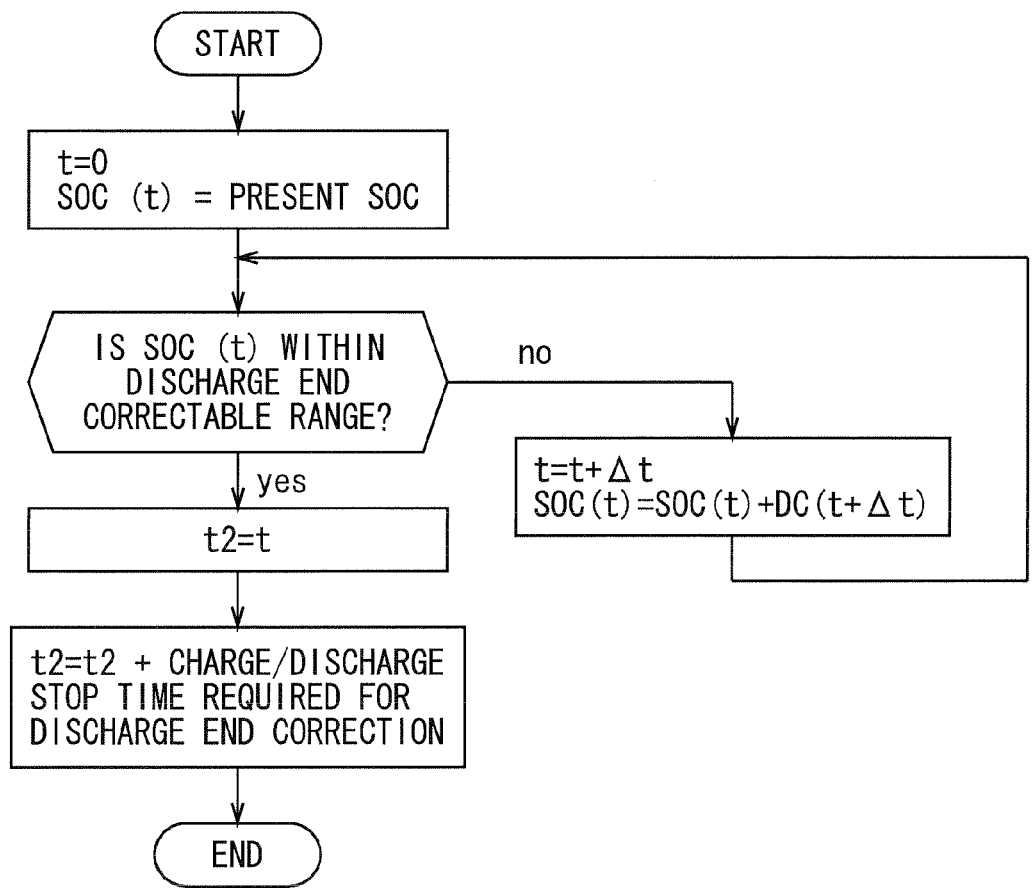
FIG. 6 is a flowchart showing a method for calculating a predicted time required to complete a discharge end correction, in the first embodiment of the present invention.

FIG. 5 is a flowchart showing a method for calculating the predicted time required to complete the charge end correction. Meanwhile, FIG. 6 is a flowchart showing a method for calculating the predicted time required to complete the discharge end correction. A SOC(t) shown in FIGS. 5 and 6 represents the remaining capacity management value after a time t. A DC(t+Δt) represents the energy amount predicted to be charged/discharged for the correction target NaS battery 11 from the time t to a time t+Δt in the case where the correction target NaS battery 11 is preferentially discharged. A CH(t+Δt) represents the energy amount predicted to be charged/discharged for the correction target NaS battery 11 from the time t to a time t+Δt in the case where the correction target NaS battery 11 is preferentially charged. As for both of the DC and CH, a discharge direction is a positive value. In addition, when the DC and CH are predicted, the losses in the bidirectional converter 13, the NaS battery 11 and so on at the time of the charging and discharging are to be considered, as a matter of course. This is true in FIGS. 13 and 14 which will be described below.

As shown in FIG. 5, a time (t1) predicted to be required to complete the charge end correction consists of the time required for the energy amount including the present remaining capacity management value, and the energy amount predicted to be charged/discharged for the correction target NaS battery 11 in the case where the correction target NaS battery 11 is preferentially charged, to reach the remaining capacity in the vicinity of the charge end, and the predetermined charge/discharge stop time.

Meanwhile, as shown in FIG. 6, a time (t2) predicted to be required to complete the discharge end correction consists of the time required for the energy amount including the present remaining capacity management value, and the energy amount predicted to be charged/discharged for the correction target NaS battery 11 in the case where the correction target NaS battery 11 is preferentially discharged, to reach the remaining capacity in the vicinity of the discharge end, and the predetermined charge/discharge stop time.

(Selection of Correction Method)

Then, the correction method selecting part 174 compares the predicted time t1 required to complete the charge end correction with the predicted time t2 required to complete the discharge end correction, predicted by the first correction time predicting part 173, and selects the correction method which is short in predicted time.

Then, the charge/discharge commanding part 18 controls the bidirectional converter 13 such that the correction target NaS battery 11 and the non-correction target NaS battery 11 are charged/discharged until the correction target NaS battery 11 reaches the remaining capacity in which the correction can be made by the correction method selected by the correction method selecting part 174.

At this time, in the case where the charge end correction is selected, the charge/discharge energy amount of the correction target NaS battery 11 is controlled so as to be the charge side within an achievable range, by lowering the output power of the interconnected system 10 within the allowable range, increasing the generation power of the power generation device 2, giving priority to the charge of the correction target NaS battery 11, and giving priority to the discharge of the non-correction target NaS battery 11.

In addition, in the case where the discharge end correction is selected, the charge/discharge energy amount of the correction target NaS battery 11 is controlled so as to be the discharge side within an achievable range, by raising the output power of the interconnected system 10 within the allowable range, decreasing the generation power of the power generation device 2, giving priority to the discharge of the correction target NaS battery 11, and giving priority to the charge of the non-correction target NaS battery 11.

Figure 7A:
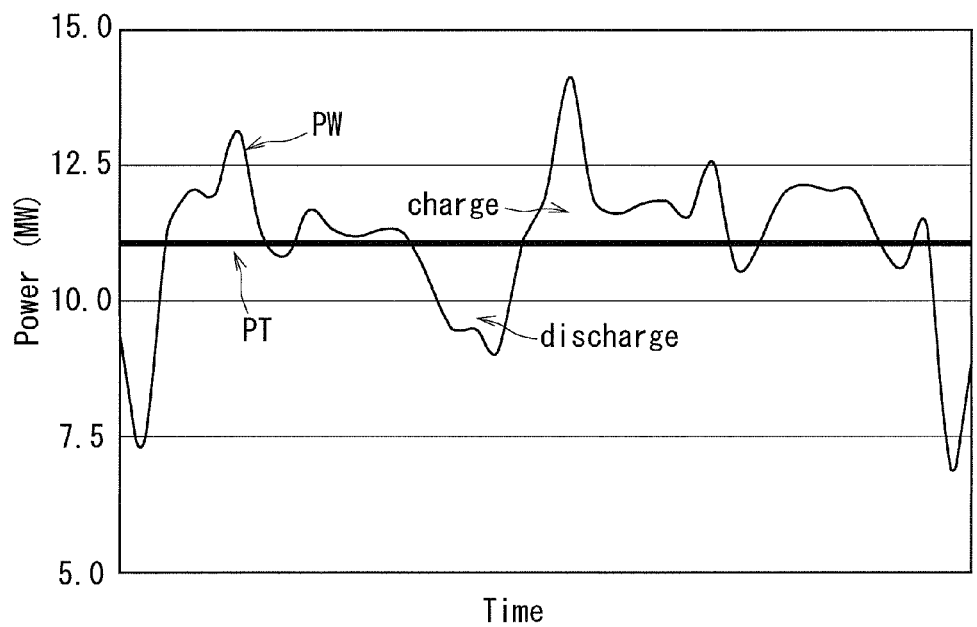
FIGS. 7A and 7B are charts showing an example in which output power is set such that a charge energy amount becomes equal to a discharge energy amount in a unit of time.
Figure 7B:
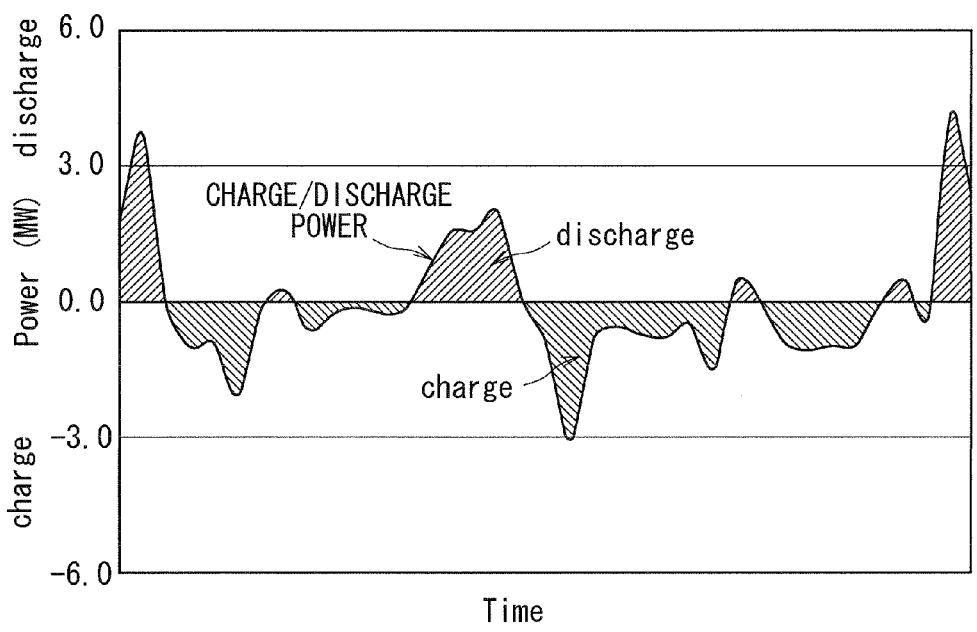

A description will be made of the case where the output power of the interconnected system 10 is decreased or increased within the allowable range with reference to FIGS. 7A to 9B. FIGS. 7A and 7B are charts showing an example in which the output power PT of the interconnected system 10 is set such that the charge energy amount becomes equal to the discharge energy amount in a unit of time. FIG. 7A is a chart showing the generation power of the power generation device 2 and the output power of the interconnected system 10 in the unit of time. The $P_W$ represents the generation power of the power generation device 2 in the interconnected system 10, and a PT represents the output power of the interconnected system 10. FIG. 7B is a chart showing the charge/discharge power for the NaS battery 11 in the unit of time. As shown in FIG. 7B, the charge energy amount and discharge energy amount of the NaS battery 11 are almost equal to each other in an illustrated time range.

Figure 9A:
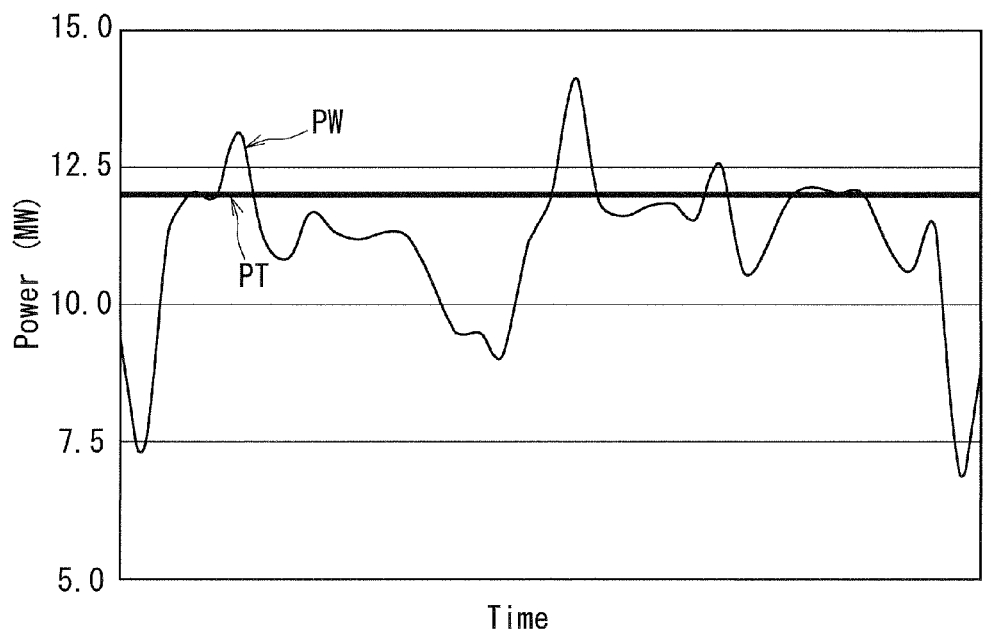
FIGS. 9A and 9B are charts showing an example in which output power is set such that a charge energy amount becomes smaller than a discharge energy amount in a unit of time.
Figure 9B:
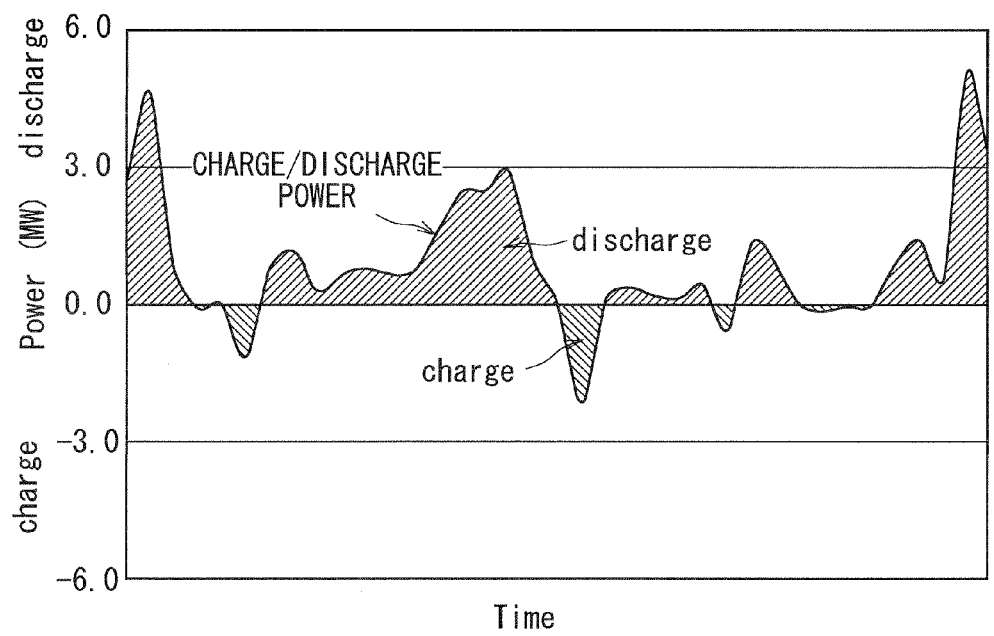

Meanwhile, FIGS. 8A and 8B are charts showing an example in which the output power PT of the interconnected system 10 is set such that the charge energy amount becomes greater than the discharge energy amount in the unit of time. As shown in FIG. 8B, the charge energy amount is greater than the discharge energy amount in an illustrated time range. In addition, FIGS. 9A and 9B are charts showing an example in which the output power PT of the interconnected system 10 is set such that the charge energy amount becomes smaller than the discharge energy amount in the unit of time. As shown in FIG. 9B, the charge energy amount is smaller than the discharge energy amount in the illustrated time range.

In addition, instead of comparing the predicted time t1 required to complete the charge end correction with the predicted time t2 required to complete the discharge end correction predicted by the first correction time predicting part 173, the correction method selecting part 174 may compare the energy amount required for charging until the remaining capacity of the correction target battery reaches the vicinity of the charge end from the present remaining capacity management value, with the energy amount required for discharging until it reaches the vicinity of the discharge end from the present remaining capacity management value which are calculated by the first charge/discharge energy amount calculating part 171, and select a correction method which is small in required energy amount.

In addition, in a case where the correction target battery has the battery remaining capacity rate in which the correction can be made in the vicinity of the charge end when the correction request detecting part 16 detects the correction request, the correction made in the vicinity of the charge end may be selected, and in a case where it has the battery remaining capacity rate in which the correction can be made in the vicinity of the discharge end, the correction made in the vicinity of the discharge end may be selected.

Furthermore, as for the NaS battery, in a case where the correction target battery is in the one-phase region when the correction request detecting part 16 detects the correction request, the correction made in the vicinity of the discharge end may be selected.

(Manual Selection of Correction Method)

In addition, as for the selection of the correction method, the automatic selection of the correction method to correct the remaining capacity management value of the correction target NaS battery 11 may be stopped, and the correction method to correct the remaining capacity management value may be manually selected.

In order to enable the manual selection of the correction method, the power storage device 1 displays the predicted times which are predicted to be required to complete the correction using several correction methods on a display (not shown), and receives an input of a correction method selected by an operator from an operating part (not shown). The correction method inputted from the operating part is sent to the charge/discharge commanding part 18. Thus, the charge/discharge commanding part 18 controls the bidirectional converter 13 such that the correction target NaS battery 11 and non-correction target NaS battery 11 are charged/discharged until the correction target NaS battery 11 reaches the remaining capacity in which the correction can be made, by the correction method inputted from the operating part.

In the case where the correction method is manually selected, the operator of the power storage device 1 refers to the correction methods displayed on the display, considers present and future circumstances of the interconnected system 10 including the power storage device 1, and inputs the selected correction method from the operating part. The items to be considered by the operator include the weather forecast, presence or absence of breakdown of the power generator, and a maintenance schedule.

Thus, according to the power storage device 1 in this embodiment, the time required to complete the correction of the remaining capacity management value is previously predicted, and the correction is made by selecting the correction method which is short in predicted time, so that the remaining capacity management value can be corrected by the optimal correction method according to an intended use and an operating condition of the power storage device 1.

1-3. Simulation Result

FIGS. 10A to 11B are simulated diagrams showing the predicted time t1 required for the charge end correction and the predicted time t2 required for the discharge end correction predicted by the first correction time predicting part 173.

FIGS. 10A and 10B are diagrams provided by simulating the predicted time required for the correction of the remaining capacity management value, in the interconnected system 10 in which the NaS battery 11 is provided with the power generation device 2 such as the wind power generator, with a view to smoothing a short-period power fluctuation. The present remaining capacity management value of the correction target NaS battery 11 is set to 70% of the rating capacity.

In the case where the power storage device 1 includes the one NaS battery 11, the simulation is done such that the power smoothing is stopped and the charge and discharge for the correction are performed by transferring the power with the power system 3. In the case where the power storage device 1 is composed of several NaS batteries 11, the simulation is done such that the correction target battery is preferentially controlled such that its charge amount (or discharge amount) becomes greater, and the charge/discharge amount of the other NaS battery 11 is controlled so as to attain the purpose as the system (so as to smooth the power).

Solid lines in FIGS. 10A and 10B shows a change with time of the predicted storage amount including the present remaining capacity management value and the predicted charge/discharge energy amount in the case where the correction target NaS battery 11 is controlled so as to be preferentially charged. Meanwhile, a dotted line shows a change with time of the predicted storage amount including the present remaining capacity management value and the predicted charge/discharge energy amount in the case where the correction target NaS battery 11 is controlled so as to be preferentially discharged.

In FIG. 10A, the predicted charge/discharge energy amount predicted to be charged in the case where the correction target NaS battery 11 is preferentially charged is set to be equal to the predicted charge/discharge energy amount predicted to be discharged in the case where the correction target NaS battery 11 is preferentially discharged.

As shown in FIG. 10A, it is predicted that the correction of the remaining capacity management value is completed in a short time in the case where the charge end correction is made compared to the case where the discharge end correction is made. Therefore, in this case, the correction method selecting part 174 selects the charge end correction.

Meanwhile, in FIG. 10B, the predicted charge/discharge energy amount predicted to be charged in the case where the correction target NaS battery 11 is preferentially charged is set to be smaller than the predicted charge/discharge energy amount predicted to be discharged in the case where the correction target NaS battery 11 is preferentially discharged.

As shown in FIG. 10B, it is predicted that the correction of the remaining capacity management value is completed in a short time in the case where the discharge end correction is made compared to the case where the charge end correction is made. Therefore, in this case, the correction method selecting part 174 selects the discharge end correction.

FIGS. 11A and 11B are diagrams in which a time required to correct the remaining capacity management value is simulated when the NaS battery 11 is used in a micro grid having the solar power generator serving as the main power generation device 2. According to the NaS battery 11 used in the micro grid, the charge power is increased in the daytime, and the discharge power is increased in the night, to smooth the power fluctuation with a period of one day.

A predicted charge/discharge energy amount is predicted based on a past power generation record, a past load record, a weather forecast (sunny rate), a remaining capacity management value of the other NaS battery 11 and the like.

Solid lines in FIGS. 11A and 11B shows a change with time of a predicted storage amount including a present remaining capacity management value and the predicted charge/discharge energy amount in the case where the correction target NaS battery 11 is controlled so as to be preferentially charged. A dotted line shows a change with time of a predicted storage amount including the present remaining capacity management value and a predicted charge/discharge energy amount in the case where the correction target NaS battery 11 is controlled so as to be preferentially discharged.

In FIG. 11A, the present remaining capacity management value of the correction target NaS battery 11 is 70% of the rating capacity, and the present time is set at zero. As shown in FIG. 11A, it is predicted that the correction of the remaining capacity management value is completed in a short time in the case where the discharge end correction is made compared to the case where the charge end correction is made.

Therefore, in this case, the correction method selecting part 174 selects the discharge end correction.

Meanwhile, FIG. 11B, the present remaining capacity management value of the correction target NaS battery 11 is 50% of the rating capacity, and the present time is set at eight. As shown in FIG. 11B, it is predicted that the correction of the remaining capacity management value is completed in a short time in the case where the charge end correction is made compared to the case where the discharge end correction is made. Therefore, in this case, the correction method selecting part 174 selects the charge end correction.

Thus, the optimal method for correcting the remaining capacity management value is different depending on the intended use and the operating condition of the power storage device 1, but the optimal method for correcting the remaining capacity management value can be selected according to the intended use and the operating condition of the power storage device 1 by previously predicting the time required to correct the remaining capacity management value.

As described above, according to the power storage device 1 in this embodiment, the remaining capacity management value can be corrected by the optimal correction method according to the intended use and the operating condition of the power storage device 1.

2. Second Embodiment

2-1. Configuration of Controller 25

Next, a description will be made of the power storage device 1 according to a second embodiment of the present invention. Hereinafter, a description will be made of a configuration of a controller 25 which is different from the configuration of the controller 15 of the power storage device 1 according to the first embodiment, with reference to FIG. 12. In addition, the same component as the component of the controller 15 described in the first embodiment is marked with the same reference number and its description is omitted.

Figure 12:
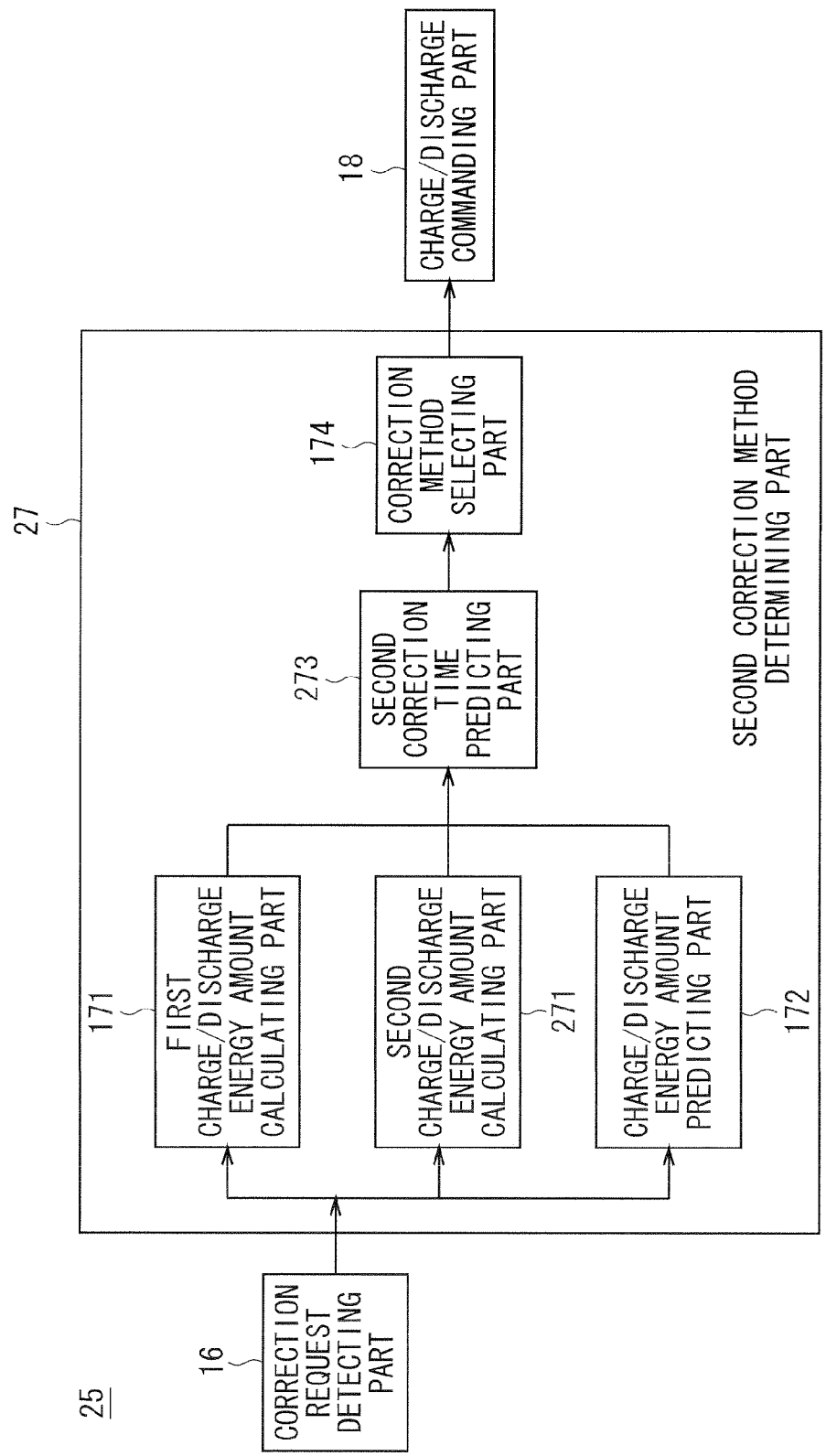
FIG. 12 is a diagram schematically showing a constitution of a controller according to a second embodiment of the present invention.

FIG. 12 is a diagram schematically showing the configuration of the controller 25. The controller 25 includes the correction request detecting part 16, a second correction method determining part 27 to determine an optimal method for correcting the remaining capacity management value for the correction target NaS battery 11, and the charge/discharge commanding part 18.

The second correction method determining part 27 includes the first charge/discharge energy amount calculating part 171, a second charge/discharge energy amount calculating part 271 which calculates an energy amount required for charging/discharging from the vicinity of the charge end to a predetermined remaining capacity set according to an intended use of the NaS battery (hereinafter, also referred to as an intended remaining capacity), and an energy amount required for charging/discharging from the vicinity of the discharge end to the intended remaining capacity, the charge/discharge energy amount predicting part 172, a second correction time predicting part 273 which predicts a time from when the correction request detecting part 16 detects the correction request till when the intended remaining capacity is attained after completion of the charge end correction, and a time till when the intended remaining capacity is attained after completion of the discharge end correction, and the correction method selecting part 174.

The controller 25 according to this embodiment is employed to correct the remaining capacity management value of the NaS battery 11 by an optimal correction method as will be described below.

2-2. Process of Controller 25

Next, a description will be made of a process of the controller 25.

First, the correction request detecting part 16 detects a request of the correction of the remaining capacity management value for any of the NaS batteries 11. Then, the first charge/discharge energy amount calculating part 171 calculates the energy amount required to charge/discharge the NaS battery 11 until the present remaining capacity management value reaches the remaining capacity in which the correction is made. Then, the charge/discharge energy amount predicting part 172 predicts the predicted charge/discharge energy amount which is available for the correction target NaS battery 11 hereafter.

Then, the second charge/discharge energy amount calculating part 271 calculates the energy amount required for charging/discharging from the vicinity of the charge end to the intended remaining capacity, and the energy amount required for charging/discharging from the vicinity of the discharge end to the intended remaining capacity.

Here, the intended remaining capacity is an optimal remaining capacity of the NaS battery to attain the intended use of the power storage device 1. After the correction has been made in the charge end or the discharge end, the further charge or the discharge is limited. Therefore, after the completion of the correction, it is preferable to charge/discharge the correction target NaS battery 11 so that the remaining capacity (intended remaining capacity) which is suitable for the intended use of the power storage device 1 can be attained. For example, in a case where it is attached to the micro grid with a view to only absorbing the fluctuation of the generation power and the load power, the intended remaining capacity is set at roughly 50% of the rating capacity, while in a case where it is operated with a view to smoothing demand powers in the daytime and the nighttime in addition to the fluctuation absorption, it is set at 10% of the rating capacity in the daytime and at 90% of the rating capacity in the nighttime.

Then, the second correction time predicting part 273 predicts the time from when the correction request detecting part 16 detects the correction request till when the intended remaining capacity is attained after the completion of the charge end correction, and the time until the intended remaining capacity is attained after the completion of the discharge end correction.

The time predicted by the second correction time predicting part 273 is predicted based on the energy amount required for the charging to the vicinity of the charge end and the energy amount required for the discharging to the vicinity of the discharge end calculated by the first charge/discharge energy amount calculating part 171, the energy amount required for charging/discharging from the vicinity of the charge end to the intended remaining capacity and the energy amount required for the charging/discharging from the vicinity of the discharge end to the intended remaining capacity calculated by the second charge/discharge energy amount calculating part 271, the predicted charge/discharge energy amount predicted by the charge/discharge energy amount predicting part 172, and the losses in the bidirectional converter and the NaS battery at the time of charging and discharging.

Figure 13:
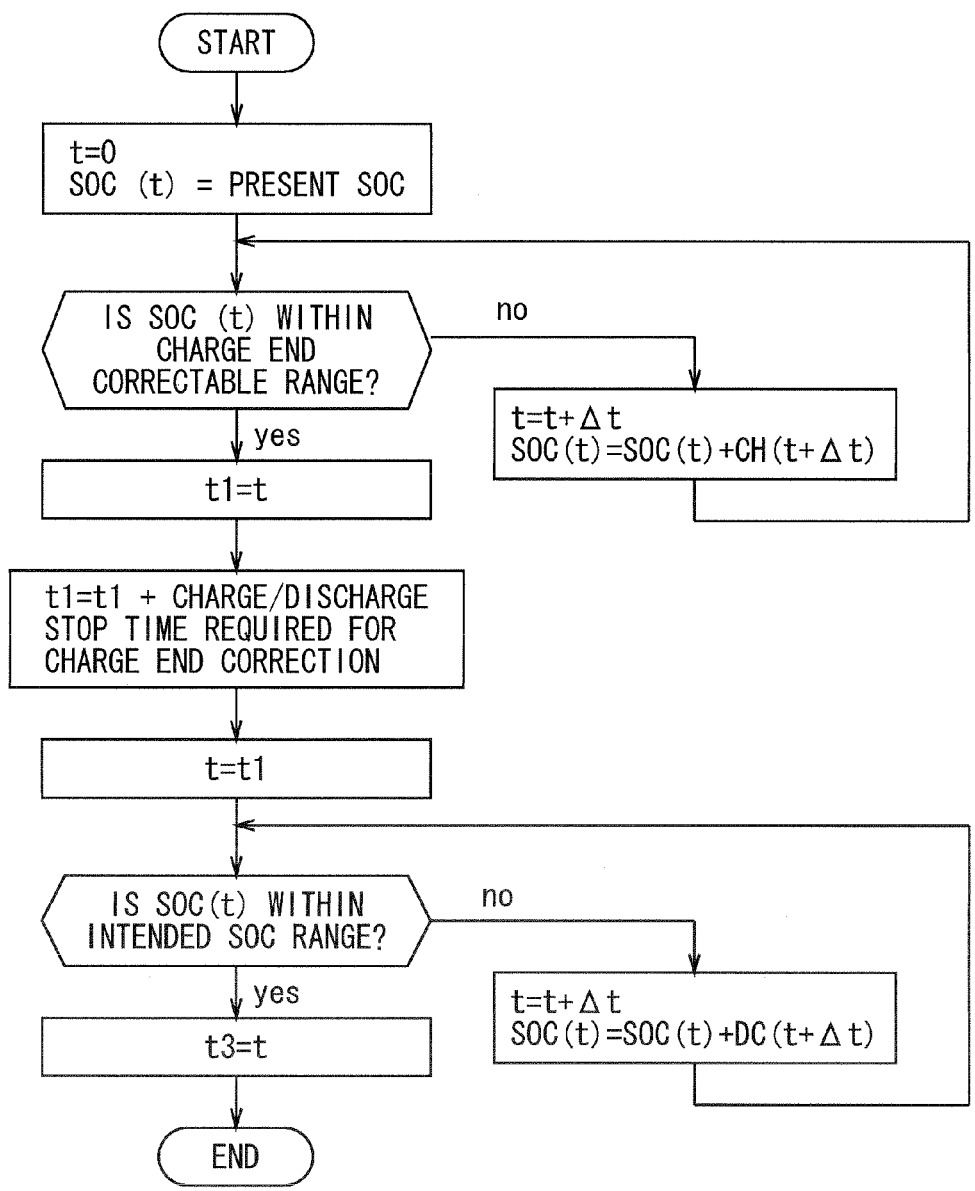
FIG. 13 is a flowchart showing a method for calculating a predicted time required to reach an intended remaining capacity in the second embodiment of the present invention.

FIG. 13 is a flowchart showing a method for calculating a predicted time from when the charge end correction is started until when the intended remaining capacity is attained. As shown in FIG. 13, as the predicted time from when the charge end correction is started until when the intended remaining capacity is attained, a time (t3) is provided by combining the time (t1) when the charge end correction is completed as predicted in FIG. 5, and the time when the remaining capacity reaches the intended remaining capacity from the vicinity of the charge end in the case where the correction target NaS battery 11 is preferentially discharged.

Figure 14:
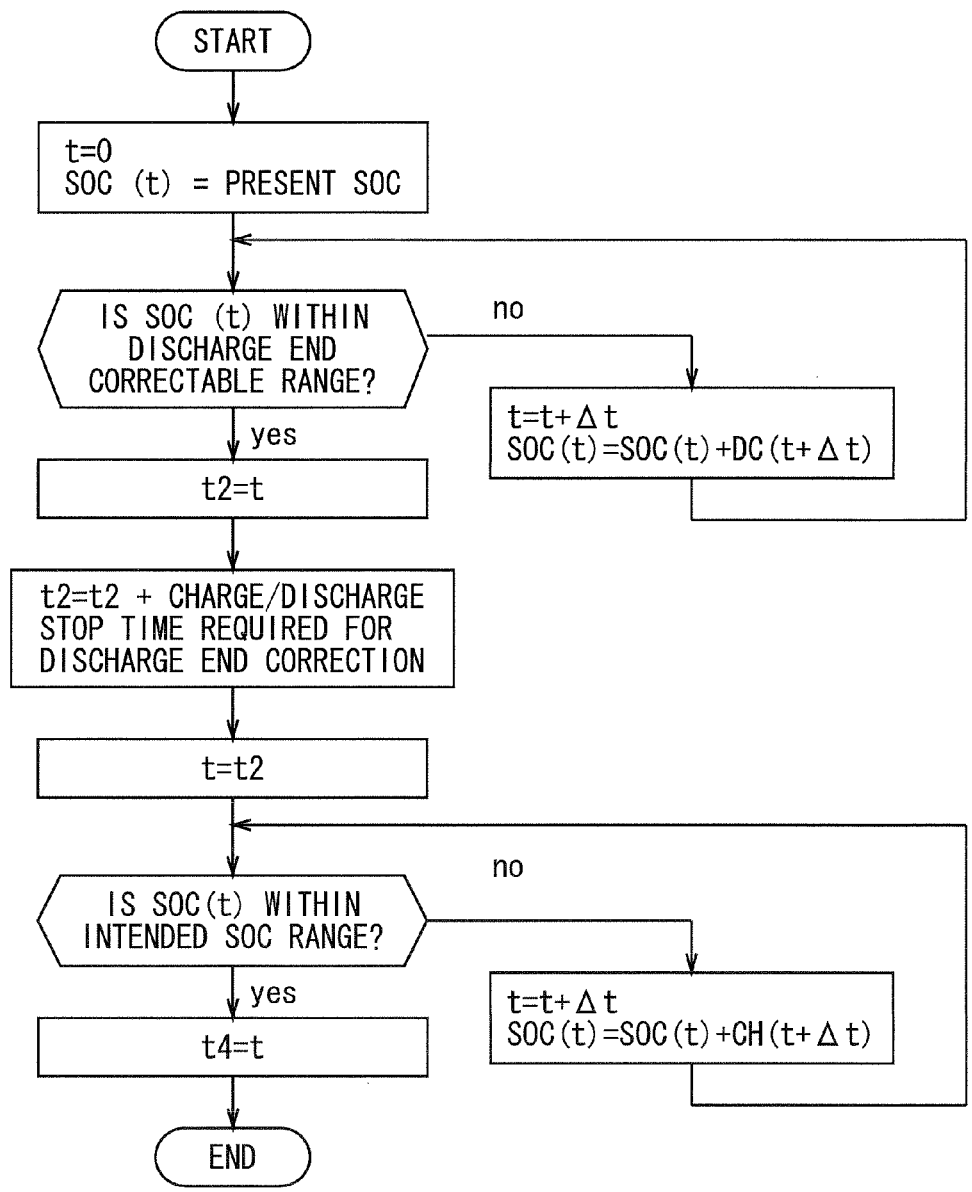
FIG. 14 is a flowchart showing a method for calculating a predicted time required to reach an intended remaining capacity in the second embodiment of the present invention.

Meanwhile, FIG. 14 is a flowchart showing a method for calculating a predicted time from when the discharge end correction is started until when the intended remaining capacity is attained. As shown in FIG. 14, as the predicted time from when the discharge end correction is started until when the intended remaining capacity is attained, a time (t4) is provided by combining the time (t2) when the discharge end correction is completed as predicted in FIG. 6, and the time when the remaining capacity reaches the intended remaining capacity from the vicinity of the discharge end in the case where the correction target NaS battery 11 is preferentially charged.

Then, the correction method selecting part 174 compares the predicted time (t3) from when the charge end correction is started until when the intended remaining capacity is attained, with the predicted time (t4) from when the discharge end correction is started until the intended remaining capacity is attained which are predicted by the second correction time predicting part 273, and selects the correction method which is short in predicted time.

Thus, the charge/discharge commanding part 18 controls the bidirectional converter 13 such that the correction target NaS battery 11 and the non-correction target NaS battery 11 are charged/discharged until the correction target NaS battery 11 reaches the remaining capacity in which the correction can be made, by the correction method selected by the correction method selecting part 174.

Thus, according to the power storage device 1 in this embodiment, the time from when the charge/discharge end correction is started until when the intended remaining capacity is attained is previously predicted and the correction is made by selecting the correction method which is short in predicted time, so that the optimal method for correcting the remaining capacity management value can be used according to the intended use and the operating condition of the power storage device 1.

2-3. Simulation Result

Figure 15A:
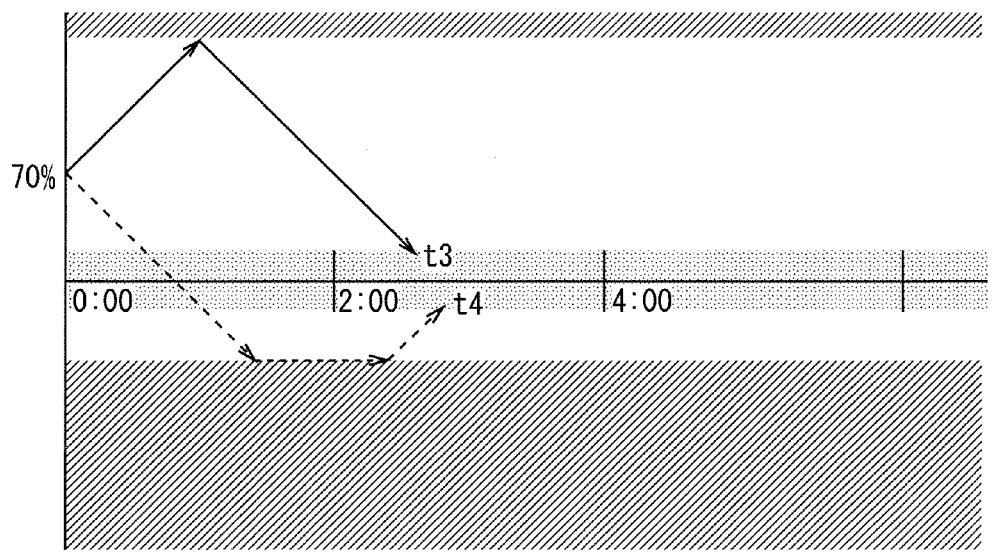
FIGS. 15A and 15B are simulated diagrams showing a predicted time required to reach an intended remaining capacity, and a predicted time required to reach an intended remaining capacity, in the second embodiment of the present invention.
Figure 15B:
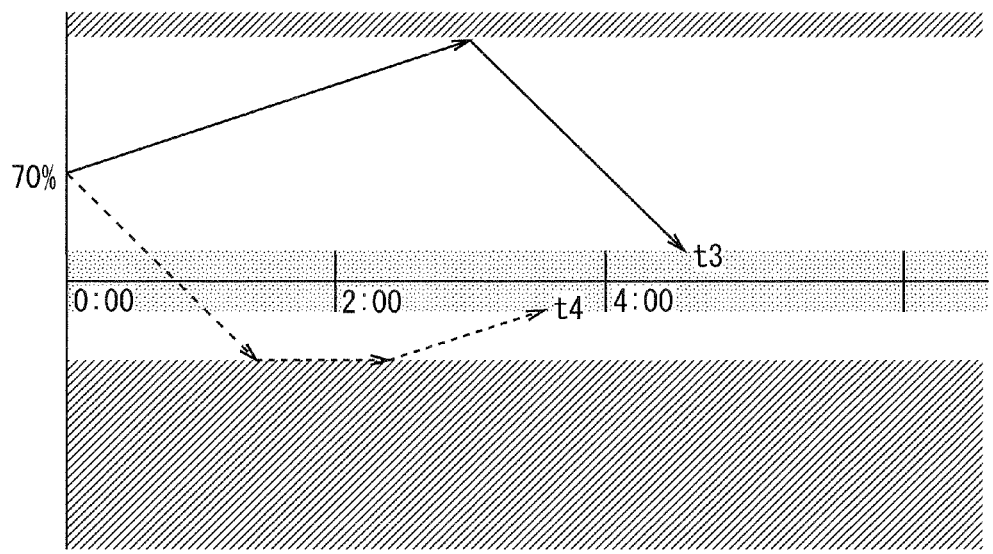

FIGS. 15A and 15B are simulated diagrams showing the predicted time t3 from when the charge end correction is started until when the intended remaining capacity is attained, and the time t4 from when the discharge end correction is started until the intended remaining capacity is attained which are predicted by the second correction time predicting part 273.

FIGS. 15A and 15B are diagrams in which the predicted time from when the charge/discharge end correction is started until when the intended remaining capacity is attained is simulated in the interconnected system 10 which is the same that in FIGS. 10A and 10B. The present remaining capacity management value of the correction target NaS battery 11 is set to 70% of the rating capacity. In addition, the intended remaining capacity is set to 45% to 55% of the rating capacity.

Solid lines in FIGS. 15A and 15B shows a change with time of a predicted storage amount including the present remaining capacity management value and the predicted charge/discharge energy amount in the case where the correction target NaS battery 11 is controlled so as to be preferentially charged before the charge end correction is made, and preferentially discharged from the charge end until the intended remaining capacity is attained. Meanwhile, a dotted line shows a change with time of a predicted storage amount including the present remaining capacity management value and the predicted charge/discharge energy amount in the case where the correction target NaS battery 11 is controlled so as to be preferentially discharged before the discharge end correction is made, and preferentially charged from the discharge end until the intended remaining capacity is attained.

In FIG. 15A, the predicted charge/discharge energy amount predicted to be charged in the case where the correction target NaS battery 11 is preferentially charged is set to be equal to the predicted charge/discharge energy amount predicted to be discharged in the case where the correction target NaS battery 11 is preferentially discharged.

As shown in FIG. 15A, it is predicted that the intended remaining capacity is attained in a short time in the case where the charge end correction is made compared to the case where the discharge end correction is made. Therefore, in this case, the correction method selecting part 174 selects the charge end correction.

Meanwhile, in FIG. 15B, the predicted charge/discharge energy amount predicted to be charged in the case where the correction target NaS battery 11 is preferentially charged is set to be smaller than the predicted charge/discharge energy amount predicted to be discharged in the case where the correction target NaS battery 11 is preferentially discharged.

As shown in FIG. 15B, it is predicted that the intended remaining capacity is attained in a short time in the case where the discharge end correction is made compared to the case where the charge end correction is made. Therefore, in this case, the correction method selecting part 174 selects the discharge end correction.

Thus, the optimal method for correcting a remaining capacity management value is different depending on the intended use and the operating condition of the power storage device 1, but the optimal method for correcting the remaining capacity management value can be provided according to the intended use and the operating condition of the power storage device 1 by previously predicting the time from when the correction of the remaining capacity management value is started until when the intended remaining capacity is attained.

As described above, according to the power storage device 1 in this embodiment, the optimal method for correcting the remaining capacity management value can be used according to the intended use and the operating condition of the power storage device 1.

3. Third Embodiment

A third embodiment relates to a micro grid 300 including the power storage device 1 according to the first embodiment. In addition, instead of the power storage device 1 according to the first embodiment, the power storage device 1 according to the second embodiment may be employed.

Figure 16:
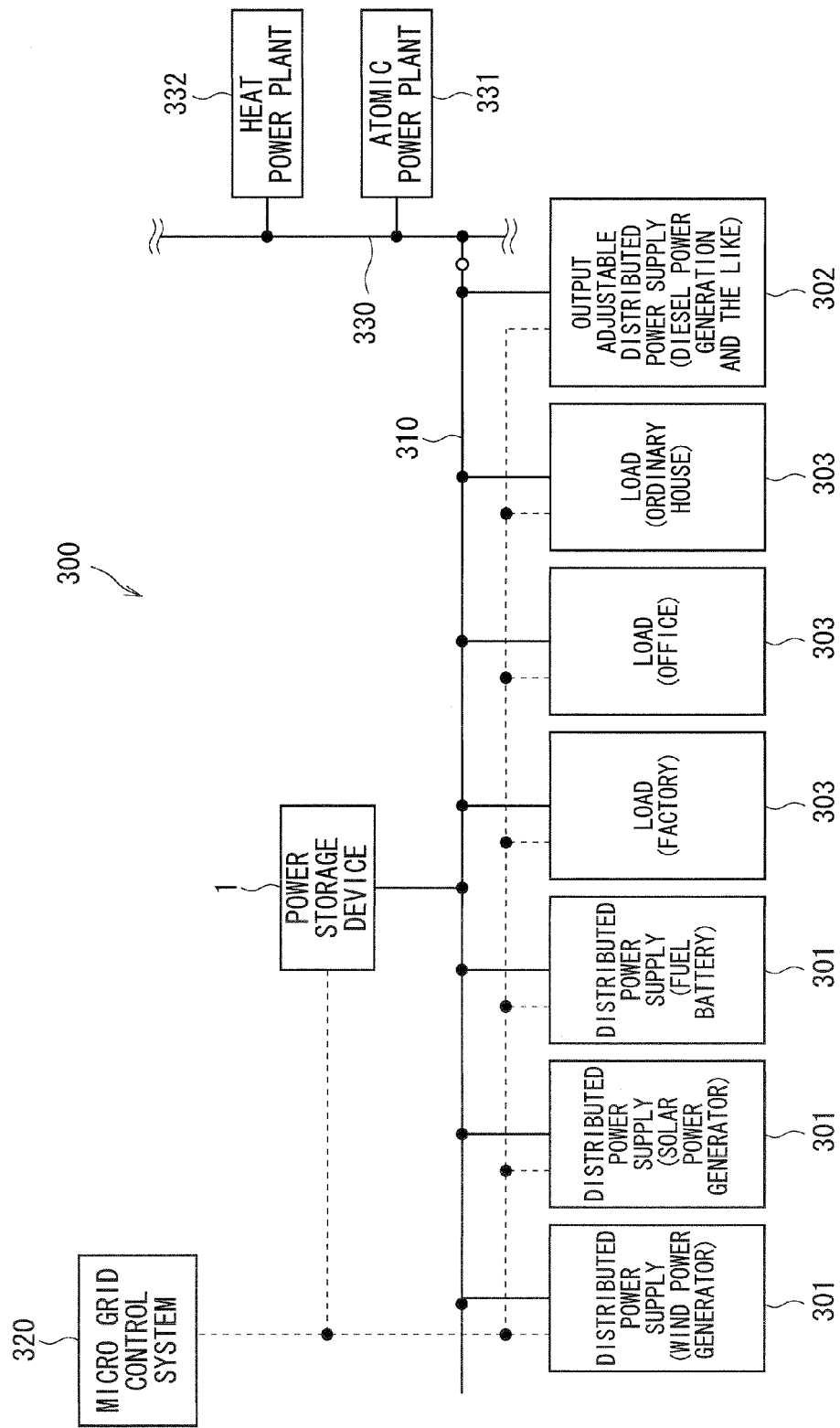
FIG. 16 is a diagram schematically showing a configuration of a micro grid, in a third embodiment of the present invention.

FIG. 16 is a diagram showing a configuration of the micro grid 300 according to this embodiment. FIG. 16 shows one example of the configuration of the micro grid 300, and another configuration may be used. The micro grid means a small-scale power supply network in which a distributed power supply is set in a region having demand for power, and also called a distributed energy system, for example.

As shown in FIG. 16, in the micro grid 300, a distributed power supply 301, an output adjustable distributed power supply 302, a load 303, and the power storage device 1 are connected to a power system 310. In addition, the power system 310 is connected to an external power system 330 to which an atomic power plant 331 and a heat power plant 332 are connected. Operations of the distributed power supply 301, the output adjustable distributed power supply 302, the load 303, and the power storage device 1 are controlled by a micro grid control system 320.

The distributed power supply 301 includes a wind power generator, a solar power generator, and a fuel battery. In addition, the output adjustable distributed power supply 302 includes a diesel generator. In addition, the load 303 includes a factory, an office, and an ordinary house.

As described above, since the power generation facility using the natural energy such as the solar light or wind is not stable in power supply, and the power load in the office, factory, ordinary house, or the like temporally fluctuates, the fluctuation of the power demand has to be compensated in the micro grid 300.

Means for compensating the fluctuation of the power supply and demand in the micro grid 300 includes the output adjustable distributed power supply 302, the power storage device 1 and the like. A main merit obtained by using the power storage device 1 as the means for compensating the fluctuation in power supply and demand is that the output adjustable power generation facility can be operated at a high power generation efficiency. More specifically, when the power fluctuation is compensated by the power storage device 1, the output fluctuation of the output adjustable power generation facility can be suppressed, so that the power generation facility can be operated at a constant output at a high output power (rating output in general), that is, the power generation facility can be operated at high power generation efficiency. In addition, as another merit, $CO_2$ emissions can be reduced. $CO_2$ emissions can become ultimately zero by combining the natural energy power generation facility with the power storage device.

In a case where the remaining capacity management value of the NaS battery 11 is corrected in the power storage device 1 composing the micro grid, the predicted charge/discharge energy amount which is available for the correction target NaS battery 11 is predicted based on power predicted to be generated and outputted by the distributed power supply 301 and the distributed power supply 302 hereafter, power which can be inputted and outputted by the non-correction target NaS battery 11 by adjusting the charge and discharge of the non-correction target NaS battery 11, a power transfer plan between the power system 310 (or the power storage device 1) and the external power system 330, a power generation plan of the output adjustable distributed power supply 302 and the like.

In addition, the method for preferentially charging/discharging the correction target NaS battery 11 can be performed by adjusting the power generation plan of the output adjustable distributed power supply 302, in addition to the above-described method. More specifically, the adjustment of the power generation plan of the output adjustable distributed power supply 302 to be made to preferentially charge/discharge the correction target NaS battery 11 is made by adjusting the output of the distributed power supply 302 to the extent that the power supply and demand balance can be maintained. For example, it is made by adjusting the operation of the distributed power supply 302 such that the output of the distributed power supply 302 is maximally changed to the extent that the power supply and demand can be maintained, or to the extent that reduction in power generation efficiency due to the output adjustment of the distributed power supply 302 falls within a previously determined allowable range.

Thus, even when the power storage device 1 is provided in the micro grid, the power storage device 1 can obtain the same effect as those of the first embodiment and the second embodiment.

<Variation>

According to the above embodiment, the charge end correction is made by charging the correction target NaS battery 11 at the constant charge power, but the present invention is not limited to this, and an auxiliary charging operation in which the charging is performed with the charging power reduced may be employed. The charge end correction can be made in each auxiliary charge end, but in a case where the correction is made in second and subsequent steps in which the charging is performed with the charging power reduced from that in a first step, a completion time of the charge end correction is to be calculated, based on a smaller value of "an upper limit of the charge power by the auxiliary charging" and "the charge power predicted to be charged in the case where the correction target battery is preferentially charged hereafter".

In addition, in a case where the prediction of the charge/discharge energy amount is not right and the correction cannot be completed at the predicted time, it may be determined again at that point whether correction should be made. In a case where the expectation is repeatedly missed, and the correction cannot be made, an operator may be informed of that on an operating screen.

Furthermore, in the case where the power storage device 1 is used in order to smooth the power at the daytime and the nighttime in a long cycle, and the state of charge of the NaS battery 11 is controlled such that the storage amount of the NaS battery 11 is in the discharge end at the daytime and in the charge end at the nighttime to a maximum extent, the first correction method determining part 17 and the second correction method determining part 27 may preferentially employ the charge end correction at the nighttime, and the discharge end correction at the daytime, based on the time the correction request is detected by the correction request detecting part 16.

The present invention has been described in detail, but the above description is illustrative and not restrictive in a whole aspect. Therefore, it is understood that various modifications and variations can be made without departing from the scope of the present invention. Especially, to combine the technical matter of one embodiment with the technical matter of the other embodiment can be naturally expected.

The invention claimed is:

1. A method for controlling a secondary battery as a target for a correction of a remaining capacity management value, in such a manner that said remaining capacity management value is corrected to one of at a predetermined percentage of a charge end and to at a predetermined percentage of a discharge end, the method comprising:

a first energy amount calculating step of calculating an energy amount required for charging from said remaining capacity management value to the predetermined percentage of said charge end, and an energy amount required for discharging from said remaining capacity management value to the predetermined percentage of said discharge end;

an energy amount predicting step of predicting a charge/discharge energy amount available for said secondary battery;

a correction time predicting step of predicting a time required to complete the correction of said remaining capacity management value to at the predetermined percentage of said charge end, and a time required to complete the correction of said remaining capacity management value to at the predetermined percentage of said discharge end, based on the energy amount calculated by said first energy amount calculating step, and the energy amount predicted by said energy amount predicting step;

a correction method selecting step of selecting a correction method having the shorter predicted time of the times predicted by said correction time predicting step; and a charge/discharge controlling step of controlling a state of charge of said secondary battery so as to correct said remaining capacity management value of said secondary battery by said selected correction method.

2. The method for controlling a secondary battery according to claim 1, further comprising:

a second energy amount calculating step of calculating an energy amount required for charging/discharging from the predetermined percentage of said charge end to a predetermined storage amount set according to an intended use of said secondary battery, and an energy amount required for charging/discharging from the predetermined percentage of said discharge end to said predetermined storage amount, wherein said correction time predicting step predicts a time required to complete the correction of said remaining capacity management value to at the predetermined percentage of said charge end and reach said predetermined storage amount, and a time required to complete the correction of said remaining capacity management value to at the predetermined percentage of said discharge end and reach said predetermined storage amount, based on the energy amount calculated by said first energy amount calculating step, the energy amount predicted by said energy amount predicting step, and the energy amount calculated by said second energy amount calculating step.

3. The method for controlling a secondary battery according to claim 1, wherein said energy amount predicting step sets the charge energy amount and discharge energy amount available for said secondary battery to the same energy amount.

4. The method for controlling a secondary battery according to claim 1, wherein in a case where a plurality of secondary batteries are provided, said energy amount predicting step predicts a charge/discharge energy amount available for said correction target secondary battery in a case where said correction target secondary battery is preferentially charged, and the secondary battery other than said correction target secondary battery is preferentially discharged, and a charge/discharge energy amount available for said correction target secondary battery in a case where said correction target secondary battery is preferentially discharged, and the secondary battery other than said correction target secondary battery is preferentially charged.

5. A power storage device provided with a secondary battery comprising:

a bidirectional converter to control charge/discharge of said secondary battery; and a controller to control said bidirectional converter so as to correct a remaining capacity management value of said secondary battery to one of at a predetermined percentage of a charge end and at a predetermined percentage of a discharge end, wherein said controller comprises:

a first energy amount calculating part to calculate an energy amount required for charging from said remaining capacity management value to the predetermined percentage of said charge end, and an energy amount required for discharging from said remaining capacity management value to the predetermined percentage of said discharge end for the secondary battery as a target for a correction of said remaining capacity management value; an energy amount predicting part to predict a charge/discharge energy amount available for said correction target secondary battery;

a correction time predicting part to predict a time required to complete the correction of said remaining capacity management value to at the predetermined percentage of said charge end, and a time required to complete the correction of said remaining capacity management value to at the predetermined percentage of said discharge end, based on the energy amount calculated by said first energy amount calculating part, and the energy amount predicted by said energy amount predicting part;

a correction method selecting part to select a correction method having the shorter predicted time of the times predicted by said correction time predicting part; and a charge/discharge commanding part to control said bidirectional converter so as to correct said remaining capacity management value of said correction target secondary battery by said selected correction method.

6. The power storage device according to claim 5, further comprising: a second energy amount calculating part to calculate an energy amount required for charging/discharging from the predetermined percentage of said charge end to a predetermined storage amount set according to an intended use of said secondary battery, and an energy amount required for charging/discharging from the predetermined percentage of said discharge end to said predetermined storage amount, wherein said correction time predicting part predicts a time required to complete the correction of said remaining capacity management value to at the predetermined percentage of said charge end and reach said predetermined storage amount, and a time required to complete the correction of said remaining capacity management value to at the predetermined percentage of said discharge end and reach said predetermined storage amount, based on the energy amount calculated by said first energy amount calculating part, the energy amount predicted by said energy amount predicting part, and the energy amount calculated by said second energy amount calculating part.

7. The power storage device according to claim 5, wherein said energy amount predicting part sets the charge energy amount and discharging energy amount available for said correction target secondary battery to the same energy amount.

8. The power storage device according to claim 5, wherein in a case where a plurality of said secondary batteries are provided, said energy amount predicting part predicts a charge/discharge energy amount available for said correction target secondary battery in a case where said correction target secondary battery is preferentially charged, and the secondary battery other than said correction target secondary battery is preferentially discharged, and a charge/discharge energy amount available for said correction target secondary battery in a case where said correction target secondary battery is preferentially discharged, and the secondary battery other than said correction target secondary battery is preferentially charged.

* * * * *

UNITED STATES PATENT AND TRADEMARK OFFICE
CERTIFICATE OF CORRECTION

Page 1 of 1

PATENT NO. : 8,963,502 B2
APPLICATION NO. : 13/433894
DATED : February 24, 2015
INVENTOR(S) : Hiroyuki Abe and Tetsuya Hatta It is certified that error appears in the above-identified patent and that said Letters Patent is hereby corrected as shown below:

Title Page, Item (63)

Please add: Related U.S. Application Data Continuation of application PCT/JP2010/066566, filed on September 24, 2010.

Signed and Sealed this
Second Day of June, 2015

Michelle K. Lee
*Director of the United States Patent and Trademark Office*